US012585805B2

(12) United States Patent
Powell et al.

(10) Patent No.: US 12,585,805 B2
(45) Date of Patent: Mar. 24, 2026

(54) IDENTIFYING AND RESOLVING CONFLICTS IN ACCESS PERMISSIONS DURING MIGRATION OF DATA AND USER ACCOUNTS

(71) Applicant: Box, Inc., Redwood City, CA (US)

(72) Inventors: Catherine Powell, Boston, MA (US); Joseph Daniel Powell, Boston, MA (US); Kevin Day, Shelburne Falls, MA (US); Bruce Duncan, Walkersville, MD (US)

(73) Assignee: Box, Inc., Redwood City, CA (US)

( * ) Notice: Subject to any disclaimer, the term of this patent is extended or adjusted under 35 U.S.C. 154(b) by 618 days.

(21) Appl. No.: 17/381,883

(22) Filed: Jul. 21, 2021

(65) Prior Publication Data

US 2023/0024602 A1      Jan. 26, 2023

(51) Int. Cl.
| | |
|---|---|
| *G06F 21/00* | (2013.01) |
| *G06F 16/21* | (2019.01) |
| *G06F 16/22* | (2019.01) |
| *G06F 21/62* | (2013.01) |

(52) U.S. Cl.
CPC ........ *G06F 21/6218* (2013.01); *G06F 16/214* (2019.01); *G06F 16/2246* (2019.01)

(58) Field of Classification Search
None
See application file for complete search history.

(56) References Cited

U.S. PATENT DOCUMENTS

| | | | | |
|---|---|---|---|---|
| 7,529,780 B1 * | 5/2009 | Braginsky | ........... | G06F 16/1787 707/999.203 |
| 9,153,138 B1 * | 10/2015 | Jewett | ...................... | G08G 5/30 |
| 10,601,876 B1 * | 3/2020 | Levy | ...................... | H04L 67/10 |
| 11,126,618 B1 * | 9/2021 | Padmanabhan | ....... | G06F 16/252 |
| 11,886,611 B1 * | 1/2024 | Fakhraie | ................. | H04L 63/10 |
| 2010/0332820 A1 * | 12/2010 | Matsushima | ......... | H04L 9/3247 713/150 |
| 2011/0016470 A1 * | 1/2011 | Cain, III | ................. | G06F 9/528 718/101 |
| 2012/0304247 A1 * | 11/2012 | Badger | ............... | G06F 21/6218 726/1 |
| 2013/0042294 A1 * | 2/2013 | Colvin | .................. | H04L 63/145 726/1 |

(Continued)

*Primary Examiner* — Eleni A Shiferaw
*Assistant Examiner* — Hassan A Hussein
(74) *Attorney, Agent, or Firm* — Sheridan Ross P.C.

(57) ABSTRACT

Embodiments provide for identifying and resolving conflicts in access permissions migrated data by receiving a set of mappings including path mappings of a hierarchy of data objects on the source system to locations on the target system for migrated data objects. Based on the received set of mappings, permissions controlling access to data objects of the hierarchy of data objects on the source system can be translated to permissions controlling access to the migrated data objects on the target system for one or more user accounts on the target system. One or more conflicts can be detected between permissions on the source system and permissions on the target system. A conflict resolution strategy can be selected from a plurality of conflict resolution strategies and the selected conflict resolution strategy can be applied to the permissions controlling access to the migrated data objects on the target system.

14 Claims, 25 Drawing Sheets

(56) References Cited

U.S. PATENT DOCUMENTS

| | | | |
|---|---|---|---|
| 2014/0156719 A1* | 6/2014 | Leggette | G06F 3/067 |
| | | | 709/201 |
| 2016/0057151 A1* | 2/2016 | Brock | H04L 67/02 |
| | | | 726/4 |
| 2016/0098573 A1* | 4/2016 | Yankovskiy | G06F 21/6218 |
| | | | 726/27 |
| 2017/0093753 A1* | 3/2017 | Summers | H04L 47/808 |
| 2017/0118244 A1* | 4/2017 | Bai | H04L 63/20 |
| 2017/0177610 A1* | 6/2017 | Knotts | G06F 40/166 |
| 2017/0371890 A1* | 12/2017 | Seker | G06F 16/162 |
| 2020/0204556 A1* | 6/2020 | Smith | G06F 21/6218 |
| 2020/0364347 A1* | 11/2020 | Lewis | G06N 20/00 |
| 2020/0387496 A1* | 12/2020 | Holmes | G06F 16/245 |
| 2021/0056224 A1* | 2/2021 | Jaleel | G06F 16/2264 |
| 2021/0097083 A1* | 4/2021 | Harris | G06F 16/838 |
| 2021/0117942 A1* | 4/2021 | Cottingham | G06Q 20/384 |
| 2021/0165759 A1* | 6/2021 | Bar-Nissan | G06F 16/119 |
| 2021/0297432 A1* | 9/2021 | Hicks | G06F 11/3447 |
| 2022/0198038 A1* | 6/2022 | Passey | G06F 21/6209 |
| 2024/0031380 A1* | 1/2024 | Lal | H04L 63/1458 |

* cited by examiner

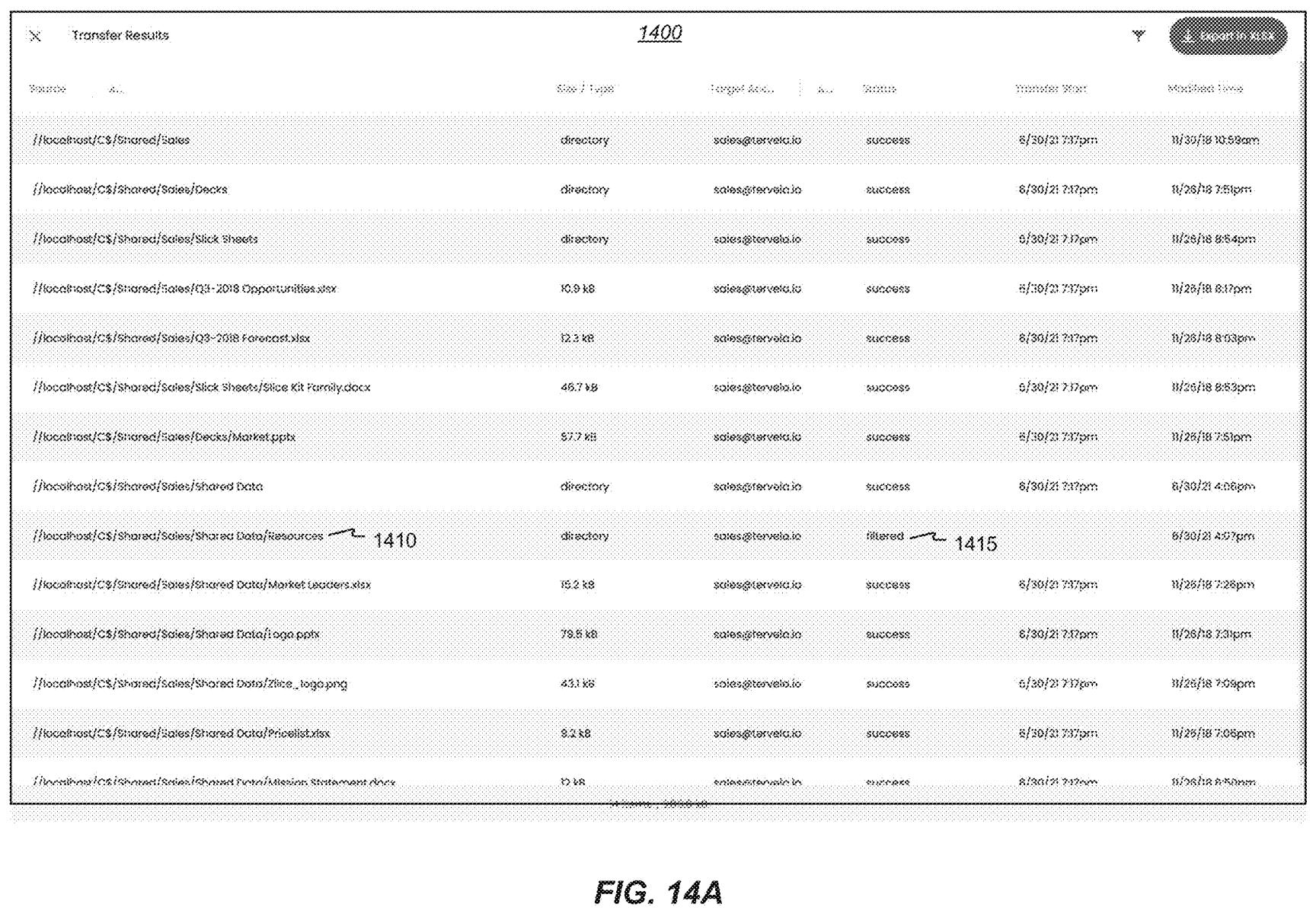

| X Transfer Results | | | | | | |
|---|---|---|---|---|---|---|
| Source | | Size / Type | Target | Status | Transfer Start | Transfer Time |
| //localhost/C$/Shared/Sales | directory | sales@tervela.io | success | 8/30/21 7:37pm | 11/30/18 10:53pm |
| //localhost/C$/Shared/Sales/Decks | directory | sales@tervela.io | success | 8/30/21 7:37pm | 11/26/18 7:51pm |
| //localhost/C$/Shared/Sales/Slick Sheets | directory | sales@tervela.io | success | 8/30/21 7:37pm | 11/26/18 8:54pm |
| //localhost/C$/Shared/Sales/Q3-2018 Opportunities.xlsx | 10.9 kB | sales@tervela.io | success | 8/30/21 7:37pm | 11/26/18 8:17pm |
| //localhost/C$/Shared/Sales/Q3-2018 Forecast.xlsx | 12.3 kB | sales@tervela.io | success | 8/30/21 7:37pm | 11/26/18 8:03pm |
| //localhost/C$/Shared/Sales/Slick Sheets/Slice Kit Family.docx | 46.7 kB | sales@tervela.io | success | 8/30/21 7:37pm | 11/26/18 8:53pm |
| //localhost/C$/Shared/Sales/Decks/Market.pptx | 57.7 kB | sales@tervela.io | success | 8/30/21 7:37pm | 11/26/18 7:51pm |
| //localhost/C$/Shared/Sales/Shared Data | directory | sales@tervela.io | success | 8/30/21 7:37pm | 8/30/21 4:08pm |
| //localhost/C$/Shared/Sales/Shared Data/Resources ~1410 | directory | sales@tervela.io | filtered ~1415 | 8/30/21 4:57pm | 8/30/21 4:57pm |
| //localhost/C$/Shared/Sales/Shared Data/Market Leaders.xlsx | 65.2 kB | sales@tervela.io | success | 8/30/21 7:37pm | 11/26/18 7:28pm |
| //localhost/C$/Shared/Sales/Shared Data/logo.pptx | 79.5 kB | sales@tervela.io | success | 8/30/21 7:37pm | 11/26/18 7:23pm |
| //localhost/C$/Shared/Sales/Shared Data/Slice_logo.png | 43.1 kB | sales@tervela.io | success | 8/30/21 7:37pm | 11/26/18 7:09pm |
| //localhost/C$/Shared/Sales/Shared Data/Pricelist.xlsx | 9.1 kB | sales@tervela.io | success | 8/30/21 7:37pm | 11/26/18 7:05pm |
| //localhost/C$/Shared/Sales/Shared Data/Mission Statement.docx | 10 kB | sales@tervela.io | success | 8/30/21 7:37pm | 11/26/18 8:50pm |

_FIG. 14A_

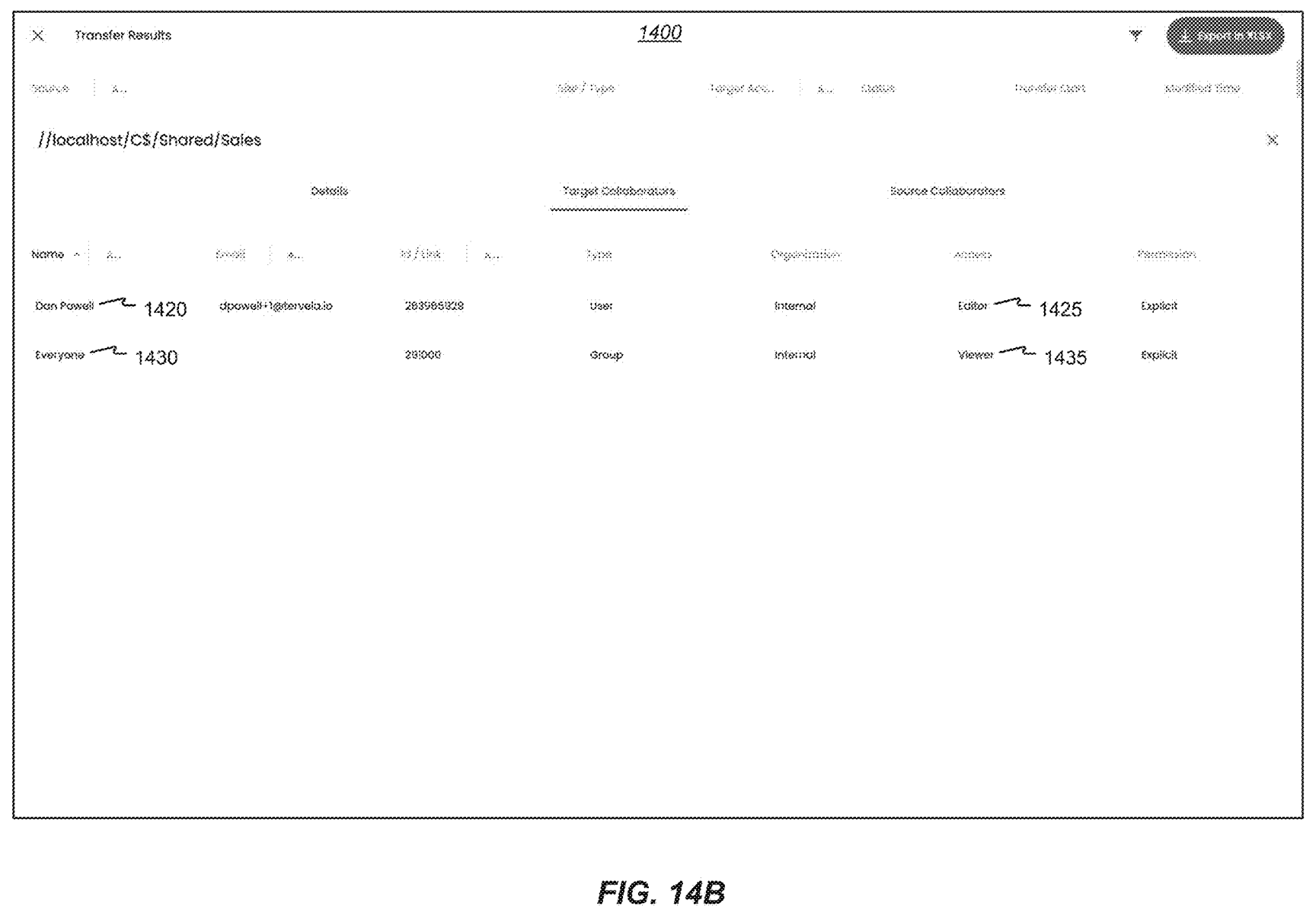

*1400*

//localhost/CS/shared/sales

| Name | | | | Type | Organization | Access | |
|---|---|---|---|---|---|---|---|
| Dan Powell ~ 1420 | dpowel-12@servia.io | 2835963228 | | User | Internal | Editor ~ 1425 | Explicit |
| Everyone ~ 1430 | | 291000 | | Group | Internal | Viewer ~ 1435 | Explicit |

*FIG. 14B*

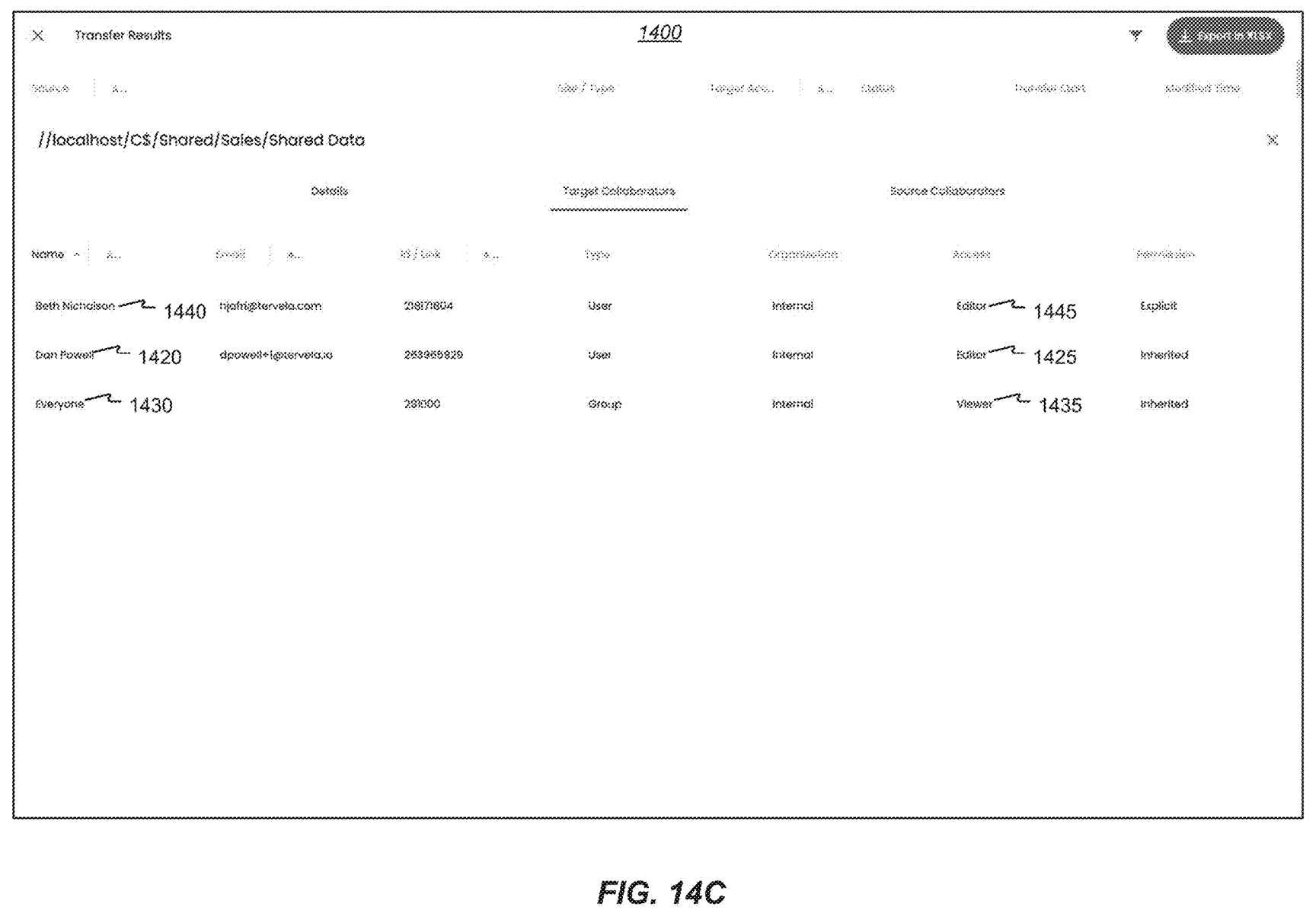

Transfer Results

//localhost/CS/Shared/Sales/Shared Data

_1400_

Details

Target Collaborations

Source Collaborations

| Name | | | User ID | | Object Type | | Collaboration | | Access | | | |
|---|---|---|---|---|---|---|---|---|---|---|---|---|
| Beth Nicholson 1440 | hjefin@kserveta.com | | 298778524 | | User | | Internal | | Editor 1445 | | Explicit |
| Dan Parcell 1420 | dparcell+k@kserveta.io | | 2836869829 | | User | | Internal | | Editor 1425 | | Inherited |
| Everyone 1430 | | | 298100 | | Group | | Internal | | Viewer 1435 | | Inherited |

_FIG. 14C_

IDENTIFYING AND RESOLVING CONFLICTS IN ACCESS PERMISSIONS DURING MIGRATION OF DATA AND USER ACCOUNTS

FIELD OF THE DISCLOSURE

Embodiments of the present disclosure relate generally to methods and systems for migrating data and user accounts from a source system to a target system and more particularly to identifying and resolving conflicts in access permissions during migration of data and user accounts.

BACKGROUND

It is common for users of computing systems to periodically wish to move their data between systems. For example, a corporation of other entity may decide to move their data and user accounts from an on-premise server to a cloud-based system or from one service provider of a cloud-based system to another. During migration between these systems, conflicts may arise between the permissions for accessing data granted to users or groups of users on the source system relative to the permissions for accessing data granted to users or groups of users on the target system. This may arise, for example, due to different capabilities between the systems. Current approaches to identifying and resolving such conflicts involve manually defining a mapping of permissions between the systems and other tedious, time consuming, and error prone manual processes. Hence, there is a need for improved methods and systems for identifying and resolving conflicts in access permissions during migration of data and user accounts.

BRIEF SUMMARY

Embodiments of the disclosure provide systems and methods for identifying and resolving conflicts in access permissions during migration of data and user accounts. According to one embodiment, a method for identifying and resolving conflicts in access permissions during migration of data and user accounts from a source system to a target system can comprise receiving a set of mappings. In some implementations, the source system can comprise either a cloud-based system or an on-premise system and the target system can comprise a cloud-based system. The set of mappings can comprise path mappings of a hierarchy of data objects on the source system to locations on the target system for migrated data objects and subject mappings of user accounts on the source system to user accounts on the target system. Based on the received set of mapping, permissions controlling access to data objects of the hierarchy of data objects on the source system can be translated to permissions controlling access to the migrated data objects on the target system for one or more user accounts on the target system. One or more conflicts can be detected between permissions controlling access to data objects of the hierarchy of data objects on the source system and permissions controlling access to the migrated data objects on the target system for at least one user account of the one or more user accounts. A conflict resolution strategy can be selected from a plurality of conflict resolution strategies and the selected conflict resolution strategy can be applied to the permissions controlling access to the migrated data objects on the target system for the at least one user account. The conflict resolution strategy can comprise one of a warn-andskip conflict resolution strategy, an expansive conflict resolution strategy, or a restrictive conflict resolution strategy.

Applying the warn-and-skip conflict resolution strategy comprises presenting an indication of the data or the user account on the source system for which a conflict has been detected.

Applying the expansive conflict resolution strategy can comprise identifying permissions for a parent data object of the data object on the source system for which the conflict has been detected at a level of the hierarchy of data objects of the source system above the data object on the source system for which the conflict has been detected, removing permissions for the migrated data for which the conflict has been detected on the target system, and allowing inheritance of the identified permissions for the parent data object by each child data object on the target system for which the conflict has been detected.

Applying the restrictive conflict resolution strategy can comprise identifying a parent data object of the data object on the source system for which the conflict has been detected at a level of the hierarchy of data objects of the source system above the data object on the source system for which the conflict has been detected. A determination can be made as to whether the identified parent data object explicitly defines permissions or is a root level of the hierarchy. In response to determining the identified parent data object defines permissions or is the root level of the hierarchy, permissions for the at least one user account can be removed from the identified parent data object, the parent data object can be added to a reprocessing list, a child data object for the identified parent data object at a lower level of the hierarchy than the identified parent data object can be identified, and permissions can be removed from the identified child data object. In some cases, applying the restrictive conflict resolution strategy can further comprise determining whether additional conflicts exist, determining whether any paths have been added to the reprocessing list, determining whether an iteration limit for the restrictive conflict resolution strategy has been reached, and in response to determining additional conflicts exist, determining paths have been added to the reprocessing list, and determining the iteration limit for the restrictive conflict resolution strategy has not been reached, repeating one or more conflicts between permissions controlling access to data objects of the hierarchy of data objects on the source system and permissions controlling access to the migrated data objects on the target system for at least one user account of the one or more user accounts and applying the selected conflict resolution strategy to the permissions controlling access to the migrated data objects on the target system for the at least one user account until determining no paths remain on the reprocessing list or determining the iteration limit for the restrictive conflict resolution strategy has been reached.

According to another embodiment, a system can comprise a processor and a memory coupled with and readable by the processor. The memory can store therein a set of instructions which, when executed by the processor, causes the processor to identify and resolve conflicts in access permissions during migration of data and user accounts from a source system to a target system by receiving a set of mappings. In some implementations, the source system can comprise either a cloud-based system or an on-premise system and the target system can comprise a cloud-based system. The set of mappings can comprise path mappings of a hierarchy of data objects on the source system to locations on the target system for migrated data objects and subject mappings of user accounts on the source system to user accounts on the target system. Based on the received set of mapping, permissions controlling access to data objects of the hierarchy of data objects on the source system can be translated to permissions controlling access to the migrated data objects on the target system for one or more user accounts on the target system. One or more conflicts can be detected between permissions controlling access to data objects of the hierarchy of data objects on the source system and permissions controlling access to the migrated data objects on the target system for at least one user account of the one or more user accounts. A conflict resolution strategy can be selected from a plurality of conflict resolution strategies and the selected conflict resolution strategy can be applied to the permissions controlling access to the migrated data objects on the target system for the at least one user account. The conflict resolution strategy can comprise one of a warn-and-skip conflict resolution strategy, an expansive conflict resolution strategy, or a restrictive conflict resolution strategy.

Applying the warn-and-skip conflict resolution strategy comprises presenting an indication of the data or the user account on the source system for which a conflict has been detected.

Applying the expansive conflict resolution strategy can comprise identifying permissions for a parent data object of the data object on the source system for which the conflict has been detected at a level of the hierarchy of data objects of the source system above the data object on the source system for which the conflict has been detected, removing permissions for the migrated data for which the conflict has been detected on the target system, and allowing inheritance of the identified permissions for the parent data object by each child data object on the target system for which the conflict has been detected.

Applying the restrictive conflict resolution strategy can comprise identifying a parent data object of the data object on the source system for which the conflict has been detected at a level of the hierarchy of data objects of the source system above the data object on the source system for which the conflict has been detected. A determination can be made as to whether the identified parent data object explicitly defines permissions or is a root level of the hierarchy. In response to determining the identified parent data object defines permissions or is the root level of the hierarchy, permissions for the at least one user account can be removed from the identified parent data object, the parent data object can be added to a reprocessing list, a child data object for the identified parent data object at a lower level of the hierarchy than the identified parent data object can be identified, and permissions can be removed from the identified child data object. In some cases, applying the restrictive conflict resolution strategy can further comprise determining whether additional conflicts exist, determining whether any paths have been added to the reprocessing list, determining whether an iteration limit for the restrictive conflict resolution strategy has been reached, and in response to determining additional conflicts exist, determining paths have been added to the reprocessing list, and determining the iteration limit for the restrictive conflict resolution strategy has not been reached, repeating one or more conflicts between permissions controlling access to data objects of the hierarchy of data objects on the source system and permissions controlling access to the migrated data objects on the target system for at least one user account of the one or more user accounts and applying the selected conflict resolution strategy to the permissions controlling access to the migrated data objects on the target system for the at least one user account until determining no paths remain on the reprocessing list or determining the iteration limit for the restrictive conflict resolution strategy has been reached.

According to yet another embodiment, a non-transitory, computer-readable medium can comprise a set of instructions stored therein which, when executed by a processor, causes the processor to identify and resolve conflicts in access permissions during migration of data and user accounts from a source system to a target system by receiving a set of mappings. In some implementations, the source system can comprise either a cloud-based system or an on-premise system and the target system can comprise a cloud-based system. The set of mappings can comprise path mappings of a hierarchy of data objects on the source system to locations on the target system for migrated data objects and subject mappings of user accounts on the source system to user accounts on the target system. Based on the received set of mapping, permissions controlling access to data objects of the hierarchy of data objects on the source system can be translated to permissions controlling access to the migrated data objects on the target system for one or more user accounts on the target system. One or more conflicts can be detected between permissions controlling access to data objects of the hierarchy of data objects on the source system and permissions controlling access to the migrated data objects on the target system for at least one user account of the one or more user accounts. A conflict resolution strategy can be selected from a plurality of conflict resolution strategies and the selected conflict resolution strategy can be applied to the permissions controlling access to the migrated data objects on the target system for the at least one user account. The conflict resolution strategy can comprise one of a warn-and-skip conflict resolution strategy, an expansive conflict resolution strategy, or a restrictive conflict resolution strategy.

Applying the warn-and-skip conflict resolution strategy comprises presenting an indication of the data or the user account on the source system for which a conflict has been detected.

Applying the expansive conflict resolution strategy can comprise identifying permissions for a parent data object of the data object on the source system for which the conflict has been detected at a level of the hierarchy of data objects of the source system above the data object on the source system for which the conflict has been detected, removing permissions for the migrated data for which the conflict has been detected on the target system, and allowing inheritance of the identified permissions for the parent data object by each child data object on the target system for which the conflict has been detected.

Applying the restrictive conflict resolution strategy can comprise identifying a parent data object of the data object on the source system for which the conflict has been detected at a level of the hierarchy of data objects of the source system above the data object on the source system for which the conflict has been detected. A determination can be made as to whether the identified parent data object explicitly defines permissions or is a root level of the hierarchy. In response to determining the identified parent data object defines permissions or is the root level of the hierarchy, permissions for the at least one user account can be removed from the identified parent data object, the parent data object can be added to a reprocessing list, a child data object for the identified parent data object at a lower level of the hierarchy than the identified parent data object can be identified, and permissions can be removed from the identified child data object. In some cases, applying the restrictive conflict resolution strategy can further comprise determining whether additional conflicts exist, determining whether any paths have been added to the reprocessing list, determining whether an iteration limit for the restrictive conflict resolution strategy has been reached, and in response to determining additional conflicts exist, determining paths have been added to the reprocessing list, and determining the iteration limit for the restrictive conflict resolution strategy has not been reached, repeating one or more conflicts between permissions controlling access to data objects of the hierarchy of data objects on the source system and permissions controlling access to the migrated data objects on the target system for at least one user account of the one or more user accounts and applying the selected conflict resolution strategy to the permissions controlling access to the migrated data objects on the target system for the at least one user account until determining no paths remain on the reprocessing list or determining the iteration limit for the restrictive conflict resolution strategy has been reached.

BRIEF DESCRIPTION OF THE DRAWINGS

FIGS. 12A and 12B are screenshots illustrating an exemplary user interface presenting migration results using an expansive conflict resolution strategy according to one embodiment of the present disclosure.

FIGS. 14A-14C are screenshots illustrating an exemplary user interface presenting migration results using a warn-and-skip conflict resolution strategy according to one embodiment of the present disclosure.

Figure 1:
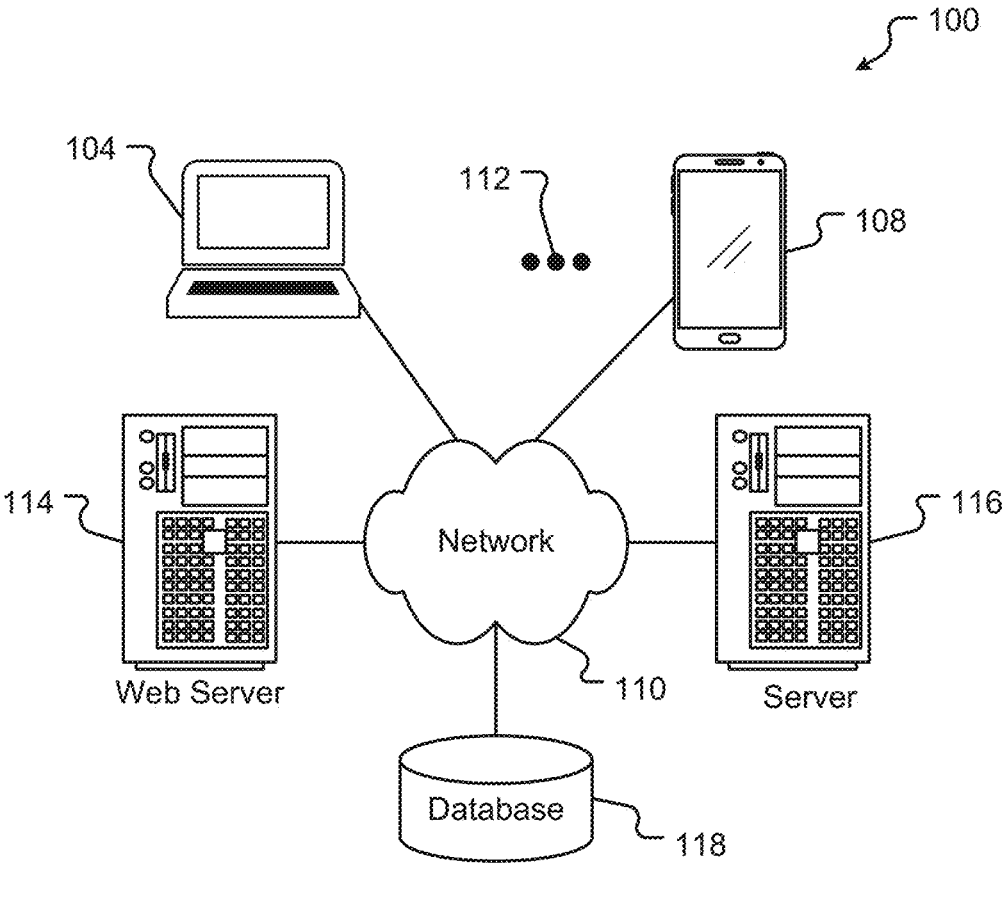
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programmable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 may be a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP servers, HyperText Transfer Protocol (secure) (HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
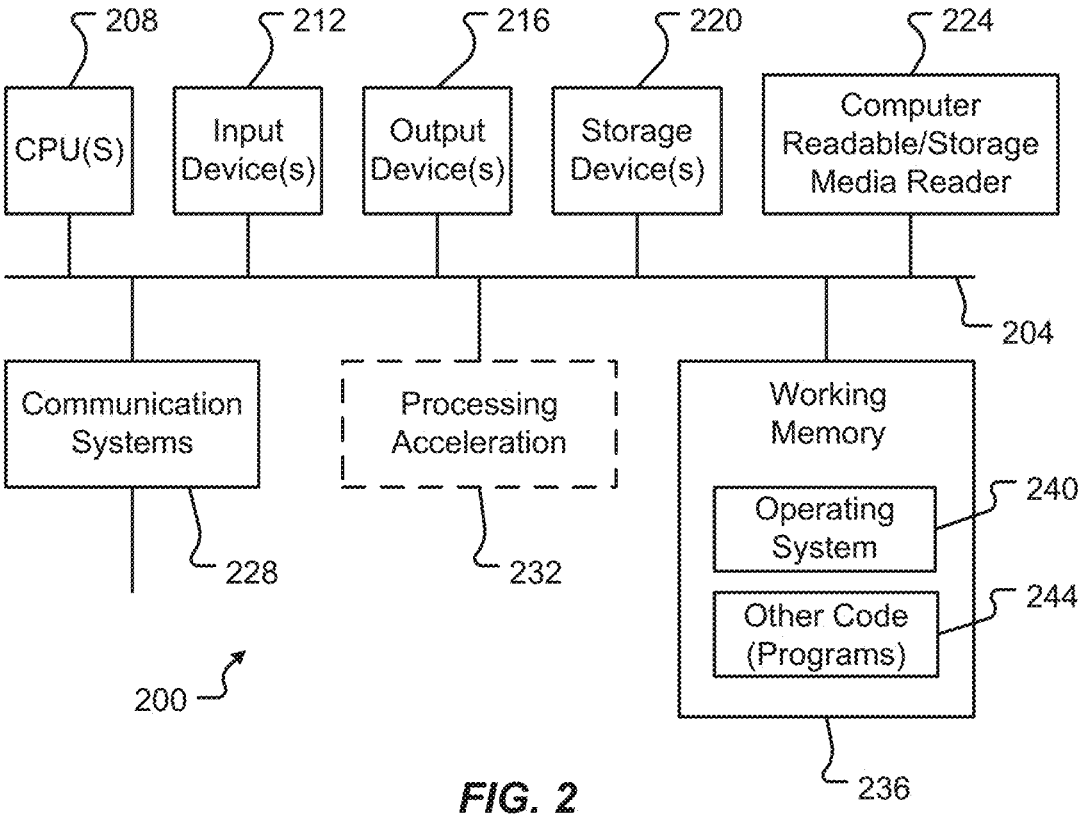
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
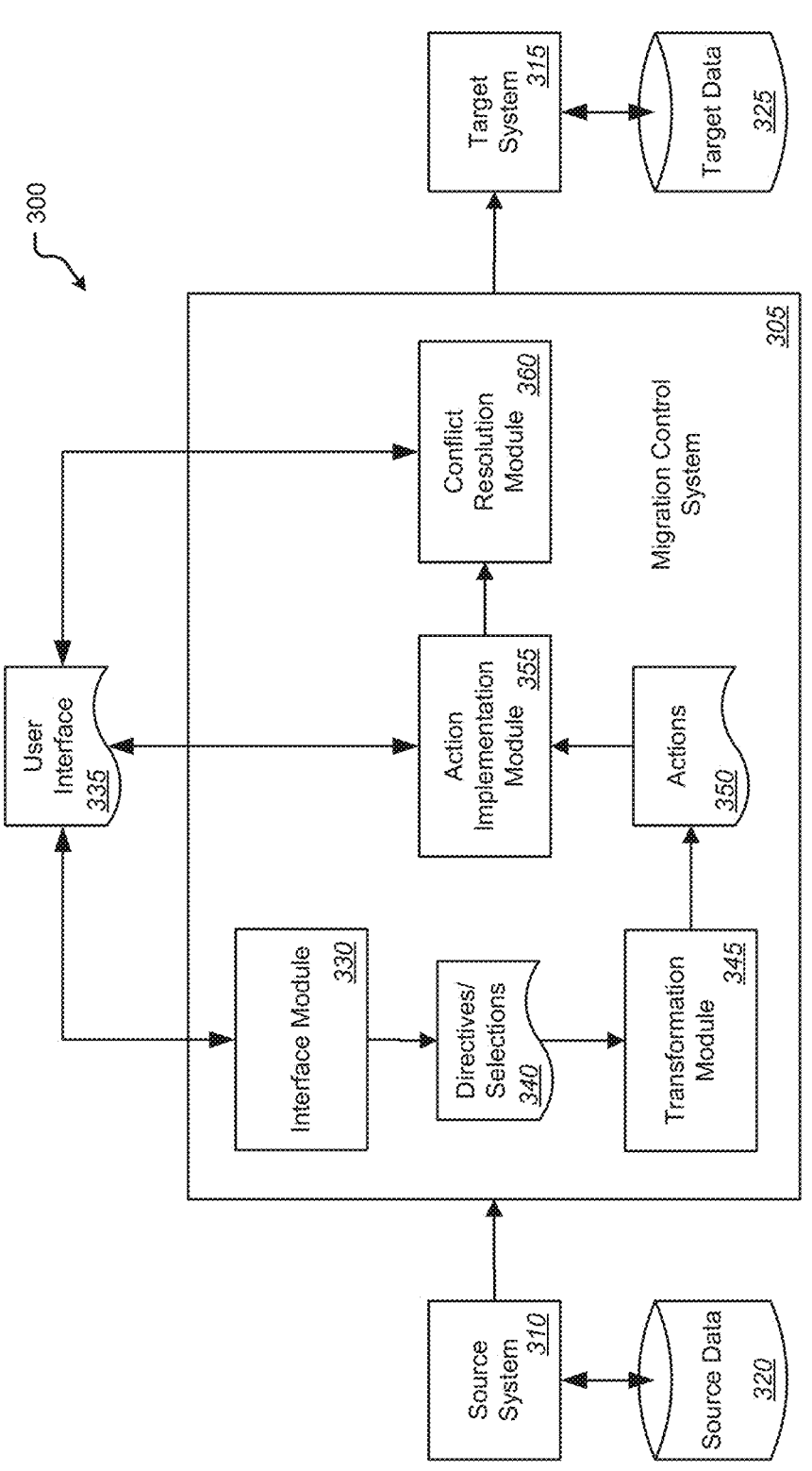
FIG. 3 is a block diagram illustrating exemplary components of an environment in which self-service migration of data between systems can be performed according to one embodiment of the present disclosure.

FIG. 3 is a block diagram illustrating exemplary components of an environment in which self-service migration of data between systems can be performed according to one embodiment of the present disclosure. As illustrated in this example, the environment 300 can include a migration control system 305 as may be implemented on any one or more servers and/or other computing devices such as described above. The migration control system 305 can be communicatively coupled with a source system 310 via any one or more wired and/or wireless communications networks as described above. The source system 310 can comprise any one or more servers and/or other computing devices as described above and can be a cloud-based system or a on-premise system. The migration control system 305 can also be communicatively coupled with a target system 315 via any one or more wired and/or wireless communications networks as described above. The target system 315 can comprise any one or more servers and/or other computing devices as described above. According to one embodiment, the target system 315 can comprise a cloud-based system. The source system 310 can maintain a set of source data 320 which can comprise, for example, a set of data objects such as files and folders accessible to users and/or groups of users of the source system 310. Generally speaking, the migration control system 305 can provide for migration of the source data 320 to a set of target data 325 of the target system 315. This migration can be performed in a self-service manner, i.e., can be performed by users of the source system 310 and/or target system 315 in a manner that does not require specialized knowledge or programming skill.

More specifically, the migration control system 305 can comprise an interface module 330 presenting a user interface 335 through which a user may define one or more directives and/or selections for the migration process. The interface module 330 can receive such a set of directives and/or selections 340 which can include, but are not limited to a selection of the source system 310, a selection of the target system 315, and/or a selection of a conflict resolution strategy. AS will be described further below, the migration control system can further automatically identify and resolve permission conflicts that develop during the migration. A conflict resolution strategy may be selected by the user through the user interface 335. The strategy may be selected from a plurality of conflict resolution strategies that can include, but are not limited to, an expansive, restrictive, or warn-and-skip strategy as will be described below.

A transformation module 345 of the migration control system 305 can then perform path mapping based on the received directives and/or selections 340. Generally speaking, path mapping can comprise identifying, e.g., based on selection 340 received through the user interface 335 of the migration control system 305, some or all user accounts, data objects, e.g., files and/or folders, of the source system 310 to be migrated, and locations for the migrated data on the target systems 315, and/or target user accounts on the target system. In some cases, the path mapping may specify that certain data objects on the source system, e.g., descendant files or folders of selections, should be skipped in the migration. Additionally, or alternatively, the path mapping may specify that certain data objects on the source system may be redirected in the migration. For example, the path mapping may specify that certain data objects on the source system e.g., descendant files or folders of selections, should be redirected to a different target location on the target system than implied by the ancestor mapping. These mappings can be represented in a set of actions 350 generated by the transformation module 345.

Based on these actions 350, an action implementation module 355 of the migration control system 305 can examine the source. Source examination can include, but is not limited to, capturing metadata from the source system 310 for all path mapping selections, e.g., properties such as size, last modified time, author, etc., identifying permissions e.g., sharee (user and/or group), role and/or rights, etc., and/or possibly performing content analysis, depending upon the type of source system, to identify, for example, links to other files, password protection, etc. Subjects may also be listed. Generally speaking, subject listing can comprise creating a list of distinct sharees and authors found in the results of source examination. Examination errors, if any, can also be displayed in the user interface 335 by the action implementation module 355. Displaying examination errors can include creating and presenting a list of source locations that were inaccessible during source examination.

Subject mapping can then be performed by the transformation module 345. Subject mapping can be based on the received selections 340 which can identify and map a user and/or group on the source system 310 to a user and/or group on the target system 315. In some cases, the received selections can mark one or more users and/or groups of the source system 310 to be skipped in the migration. This can result in the action implementation module 355 skipping any permissions involving these users or groups, and/or automatically determining a valid replacement author for any files where these users and/or groups are authors.

Permissions conflict identification and resolution can then be performed by a conflict resolution module 360 of the migration control system 305. Generally speaking, permissions conflict identification and resolution can comprise translating source permissions to proposed target permissions using provided mappings, determining which proposed target permissions cannot be represented on the target system 315 due to capability limitations and thereby represent a permissions conflict, and applying a selected conflict resolution strategy to the determined permissions conflicts to produce a new set of proposed target permissions. Examples of mapping errors can include, but are not limited to attempting to merge two source folders into the same target folder where the names of some files overlap, e.g., /project apollo/schedule.xlsx and /project mercury/schedule.xlsx both being mapped to/project archive/schedule.xlsx. Another example of a mapping error can be mapping a source user to a target user that does not exist. Mapping errors and any unresolvable permissions conflicts can be displayed by the conflict resolution module 360 through the user interface 335 of the migration control system 305.

When determining which permissions represent conflicts, the conflict resolution module 360 can take into account subject skipping of specified users and/or groups. Such users and/or groups can be specified as part of the selections 340 through the user interface 335. The conflict resolution module 360 can also take into account path mapping redirects. For example, if the root folder of source UserA was mapped to the root folder of target UserZ, but a subfolder of source UserA was redirected to a subfolder of target UserX the conflict resolution module 360 can identify and resolve this potential conflict. Additionally, or alternatively, the conflict resolution module 360 can also take into account group membership. For example, if a child folder has an explicit permission for a user with the viewer role, but also has an inherited group permission with the editor role, the conflict resolution module 360 can determine if the user is a member of the group to determine which conflict resolution strategy to use.

The conflict resolution strategies can include, but are not limited to, a warn-and-skip conflict resolution strategy, an expansive conflict resolution strategy, and/or a restrictive conflict resolution strategy. As the name suggests, the warn-and-skip conflict resolution strategy can comprise issuing a warning by the conflict resolution module 360 though the user interface 335 of the migration control system 305 and taking no further action to migrate that data or user to the target system 315.

Under the expansive conflict resolution strategy, the conflict resolution module 360 can add users or groups to a child file or folder until they match the permissions of the parent folder. The conflict resolution module 360 can copy the permissions from the parent to replace the permissions on the child. In effect, all explicit permission downgrades and removals are removed from the child. In the case where the expansion is a promotion (e.g., from viewer to editor), the lower permission user is removed from the child, and the same user is added with the promoted role. Any explicit child permissions that are not in conflict (e.g., adding a new user, or upgrading a role) are preserved.

Under the restrictive conflict resolution strategy, the conflict resolution module 360 can walk up the tree until it finds the path at which the permission in conflict is added, or to the root source file directory, whichever is first. The conflict resolution module 360 can then remove the permission there, and add the path to a reprocessing list. After the first processing, paths in the reprocessing list and their descendants can be walked by conflict resolution module 360 to determine if there are any new conflicts. Any new conflicts are managed by additional walks back up the tree, and subsequent walks back down. A limit can be placed on the number of iterations performed by the conflict resolution module 360. Note that this process can also apply if permissions are not being removed for a user or group completely, but instead, are changing the role that user or group has on the file or folder to a role with fewer privileges. So, if the permission specified a viewer role for a given user on a child folder, but there was a permission on the parent that specified the editor role for that same user, the conflict resolution module 360 can walk up the tree to the location of the explicit granting of the editor role, change that role to viewer, and then do the same walking iterations to propagate the change to affected descendants.

Figure 4:
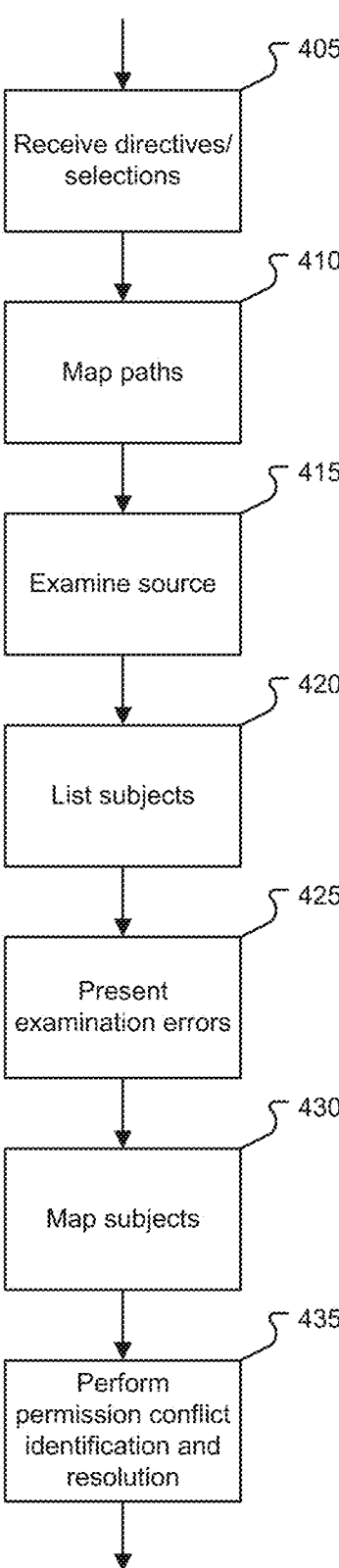
FIG. 4 is a flowchart illustrating an exemplary process for performing self-service migration of data between systems according to one embodiment of the present disclosure.

FIG. 4 is a flowchart illustrating an exemplary process for performing self-service migration of data between systems according to one embodiment of the present disclosure. As illustrated in this example, performing self-service migration of data between systems can begin with receiving 405, e.g., through a user interface of a migration control system 305 such as described above, a set of directives and/or selections. These directives and/or selections can include, but are not limited to a source system selection, either a cloud system or an on-premise system, a target system selection, and/or a conflict resolution strategy selection, e.g., an expansive, restrictive, or warn-and-skip strategy as will be described below.

Path mapping 410 can be performed based on the received 405 selections. Generally speaking, path mapping 410 can comprise identifying, e.g., based on selection received through the user interface of the migration control system, some or all user accounts, data objects, e.g., files and/or folders, of the source system to be migrated, and locations for the migrated data on the target systems, and/or target user accounts on the target system. In some cases, the path mapping 410 may specify that certain data objects on the source system, e.g., descendant files or folders of selections, should be skipped in the migration. Additionally, or alternatively, the path mapping 410 may specify that certain data objects on the source system may be redirected in the migration. For example, the path mapping 410 may specify that certain data objects on the source system e.g., descendant files or folders of selections, should be redirected to a different target location on the target system than implied by the ancestor mapping.

The source can then be examined 415. Source examination 415 can include, but is not limited to, capturing metadata from the source system for all path mapping selections, e.g., properties such as size, last modified time, author, etc., identifying permissions e.g., share (user and/or group), role and/or rights, etc., and/or possibly performing content analysis, depending upon the type of source system, to identify, for example, links to other files, password protection, etc.

Subjects may also be listed 420. Generally speaking, subject listing 420 can comprise creating a list of distinct sharees and authors found in the results of source examination 415.

Examination errors, if any, can also be displayed 425. Displaying 425 examination errors can include creating and presenting a list of source locations that were inaccessible during source examination 415.

Subject mapping 430 can then be performed. Subject mapping 430 can be based on the received 405 selections which can identify and map a user and/or group on the source system to a user and/or group on the target system. In some cases, the received 405 selections can mark one or more users and/or groups of the source system to be skipped in the migration. This can result in the migration skipping any permissions involving these users or groups, and/or automatically determining a valid replacement author for any files where these users and/or groups are authors.

Permissions conflict identification and resolution 435 can then be performed. Generally speaking, permissions conflict identification and resolution 435 can comprise translating source permissions to proposed target permissions using provided mappings, determining which proposed target permissions cannot be represented on the target system due to capability limitations and thereby represent a permissions conflict, and applying a selected conflict resolution strategy to the determined permissions conflicts to produce a new set of proposed target permissions. Additional details of exemplary processes for performing permissions conflict identification and resolution 435 will be described below with reference to FIGS. 5-7.

Figure 5:
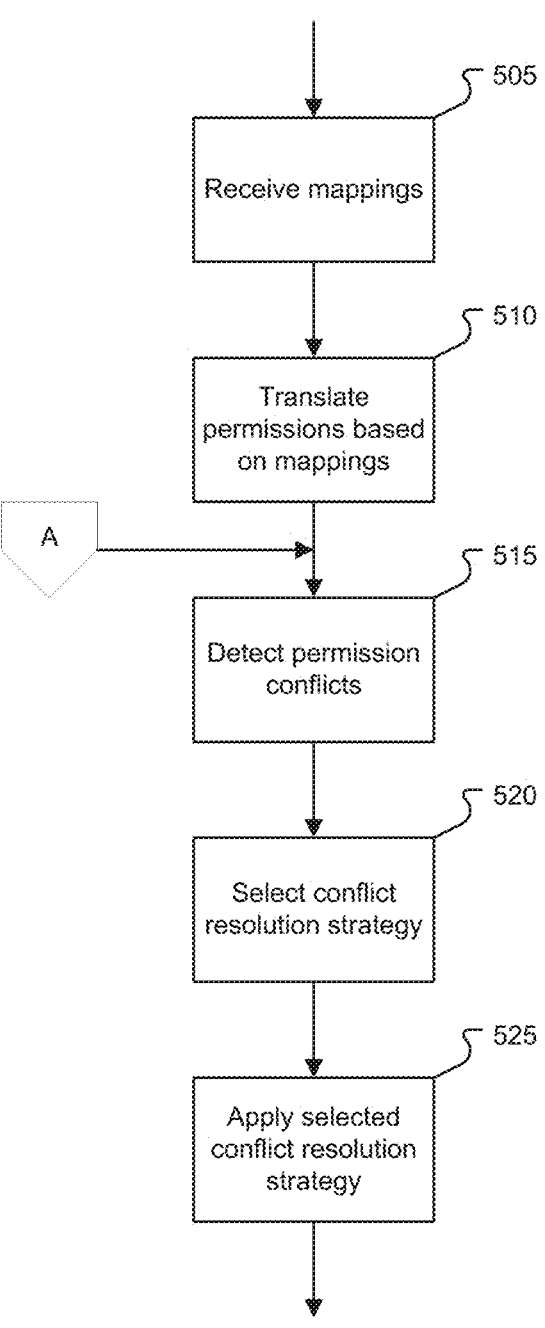
FIG. 5 is a flowchart illustrating an exemplary process for performing permission conflict identification and resolution during self-service migration of data between systems according to one embodiment of the present disclosure.

FIG. 5 is a flowchart illustrating an exemplary process for performing permission conflict identification and resolution during self-service migration of data between systems according to one embodiment of the present disclosure. As illustrated in this example, identifying and resolving conflicts in access permissions during migration of data and user accounts from a source system to a target system can comprise receiving 505 a set of mappings. The set of mappings can comprise path mappings of a hierarchy of data objects on the source system to locations on the target system for migrated data objects and subject mappings of user accounts on the source system to user accounts on the target system. Based on the received set of mapping, permissions controlling access to data objects of the hierarchy of data objects on the source system can be translated 510 to permissions controlling access to the migrated data objects on the target system for one or more user accounts on the target system. One or more conflicts can be detected 515 between permissions controlling access to data objects of the hierarchy of data objects on the source system and permissions controlling access to the migrated data objects on the target system for at least one user account of the one or more user accounts. The conflicts may arise and be detected 515, for example, based on a permission available on the source may not be available or represented on the target.

A conflict resolution strategy can be selected 520 from a plurality of conflict resolution strategies. The conflict resolution strategy can comprise one of a warn-and-skip conflict resolution strategy, an expansive conflict resolution strategy, or a restrictive conflict resolution strategy. In some cases, some or all of the strategies can have or be associated with one or more settings to expand or modify the strategy. For example, settings for a strategy can indicate that the strategy should ignore conflicts on files and apply only to conflicts on folders. In this way, the strategies can be further tailored or customized. The conflict resolution strategy can be selected 520, for example, by a user through the user interface of the migration control system or it may be preset or predetermined in another way. The selected conflict resolution strategy can be applied 525 to the permissions controlling access to the migrated data objects on the target system for the at least one user account. Applying 525 the warn-and-skip conflict resolution strategy comprises presenting an indication of the data or the user account on the source system for which a conflict has been detected and without setting permissions for the user account. Examples of applying 525 the expansive conflict resolution strategy and the restrictive conflict resolution strategy will be described below with reference to FIGS. 6 and 7.

Figure 6:
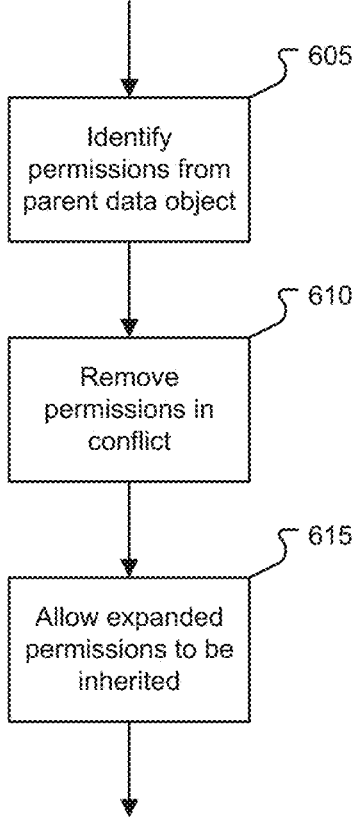
FIG. 6 is a flowchart illustrating an exemplary process for implementing an expansive conflict resolution strategy according to one embodiment of the present disclosure.

FIG. 6 is a flowchart illustrating an exemplary process for implementing an expansive conflict resolution strategy according to one embodiment of the present disclosure. As illustrated in this example, applying the expansive conflict resolution strategy can comprise identifying 605 permissions for a parent data object of the data object on the source system for which the conflict has been detected at a level of the hierarchy of data objects of the source system above the data object on the source system for which the conflict has been detected. Explicit permissions that are in conflict on the child data object are removed 610, inheritance of the expanded permissions from the parent source data object to the child target objects can be allowed 615.

Figure 7:
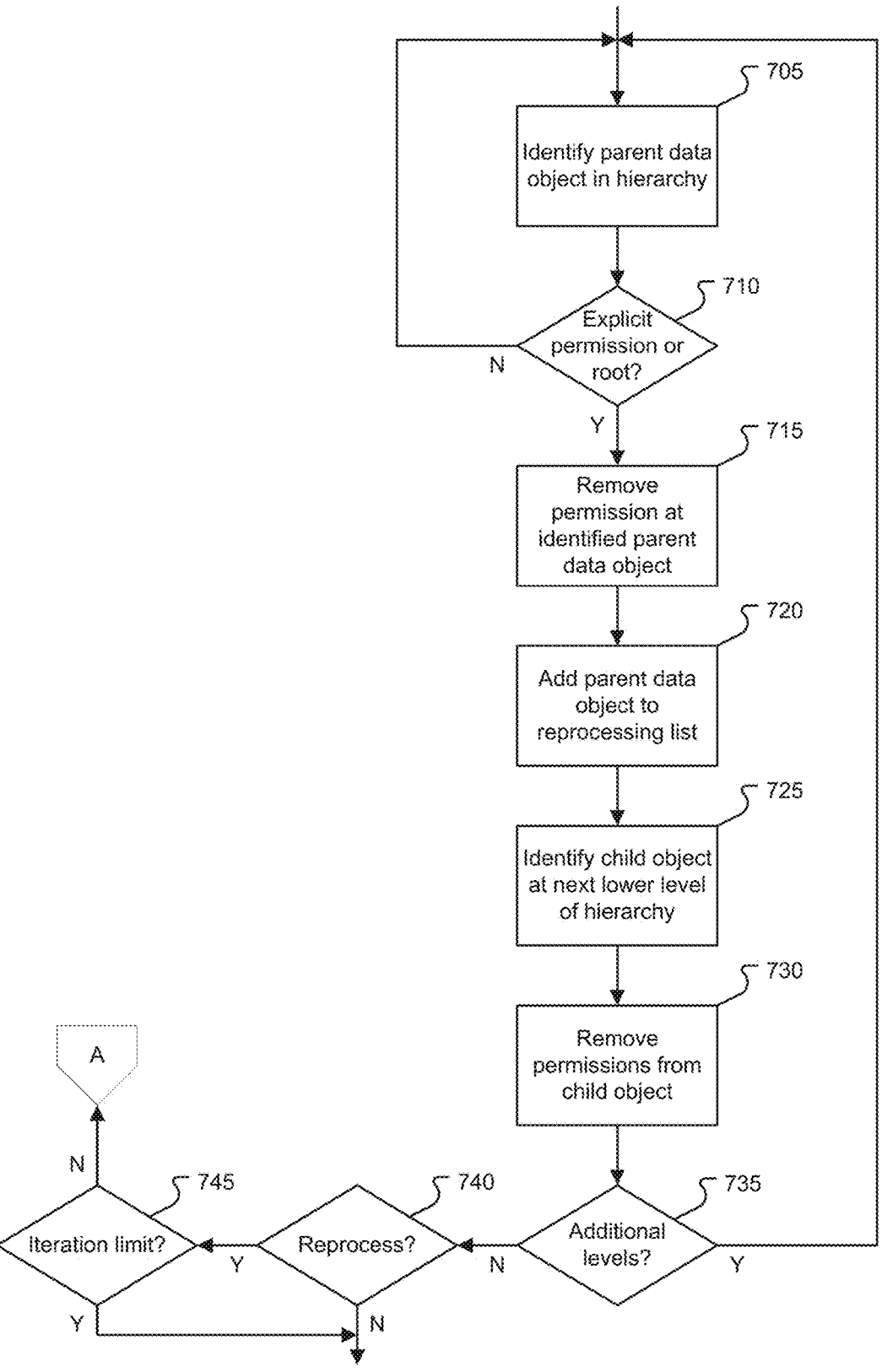
FIG. 7 is a flowchart illustrating an exemplary process for implementing a restrictive conflict resolution strategy according to one embodiment of the present disclosure.

FIG. 7 is a flowchart illustrating an exemplary process for implementing a restrictive conflict resolution strategy according to one embodiment of the present disclosure. According to this example, applying the restrictive conflict resolution strategy can comprise identifying 705 a parent data object of the data object on the source system for which the conflict has been detected at a level of the hierarchy of data objects of the source system above the data object on the source system for which the conflict has been detected. A determination 710 can be made as to whether the identified parent data object explicitly defines permissions or is a root level of the hierarchy. In response to determining the identified parent data object does not define permissions and is not the root level of the hierarchy, the next level up parent data object can be identified 705, i.e., the tree of the hierarchy can be walked upwards, until a determination 710 is made that the identified parent data object defines permissions or is the root level of the hierarchy In response to determining 710 the identified parent data object defines permissions or is the root level of the hierarchy, the reduced permission (user or group) can be removed 715 from the identified parent data object, the parent data object can be added 720 to a reprocessing list, a child data object for the identified parent data object at a lower level of the hierarchy than the identified parent data object can be identified 725, and permissions can be removed 730 from the identified child data object. In some cases, applying the restrictive conflict resolution strategy can further comprise determining 735 whether additional conflicts exist below a level of the identified child object, determining 740 whether any paths have been added to the reprocessing list, and determining 745 whether an iteration limit for the restrictive conflict resolution strategy has been reached. In response to determining 735 that additional levels remain, the strategy can continue to be applied. In response to determining 735 additional levels do not exist, determining 740 that paths have been added to the reprocessing list, and determining 745 the iteration limit for the restrictive conflict resolution strategy has not been reached, detecting additional conflicts and applying the strategy as described above with reference to FIG. 5 can be repeated until determining 735 no additional levels of the hierarchy exist below the level of the identified child object, determining 740 no paths remain in the reprocessing list, or determining 745 the iteration limit for the restrictive conflict resolution strategy has been reached.

Figure 8A:
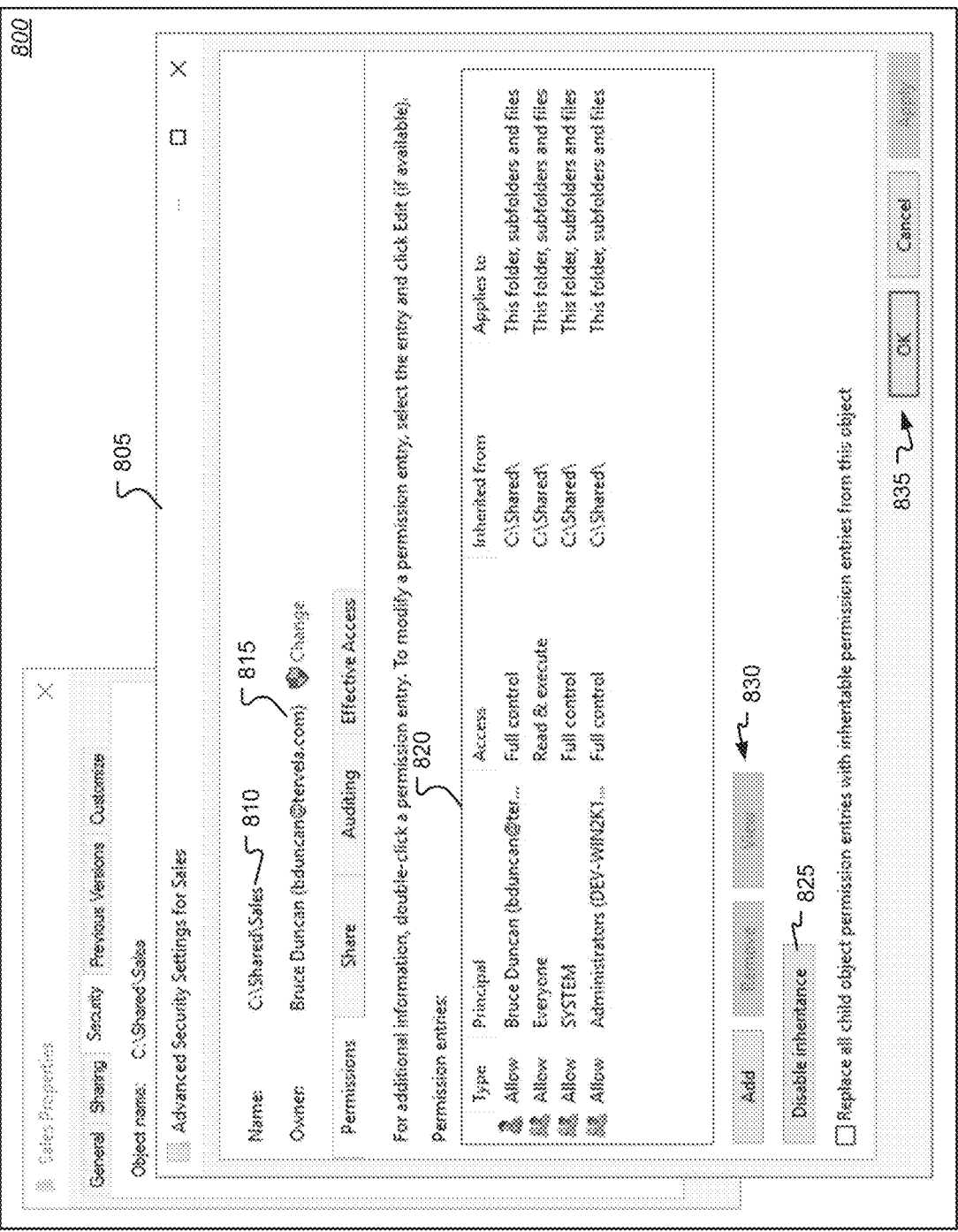
FIGS. 8A-8C are screenshots illustrating an exemplary user interface presenting exemplary permissions on a source system according to one embodiment of the present disclosure.
Figure 8B:
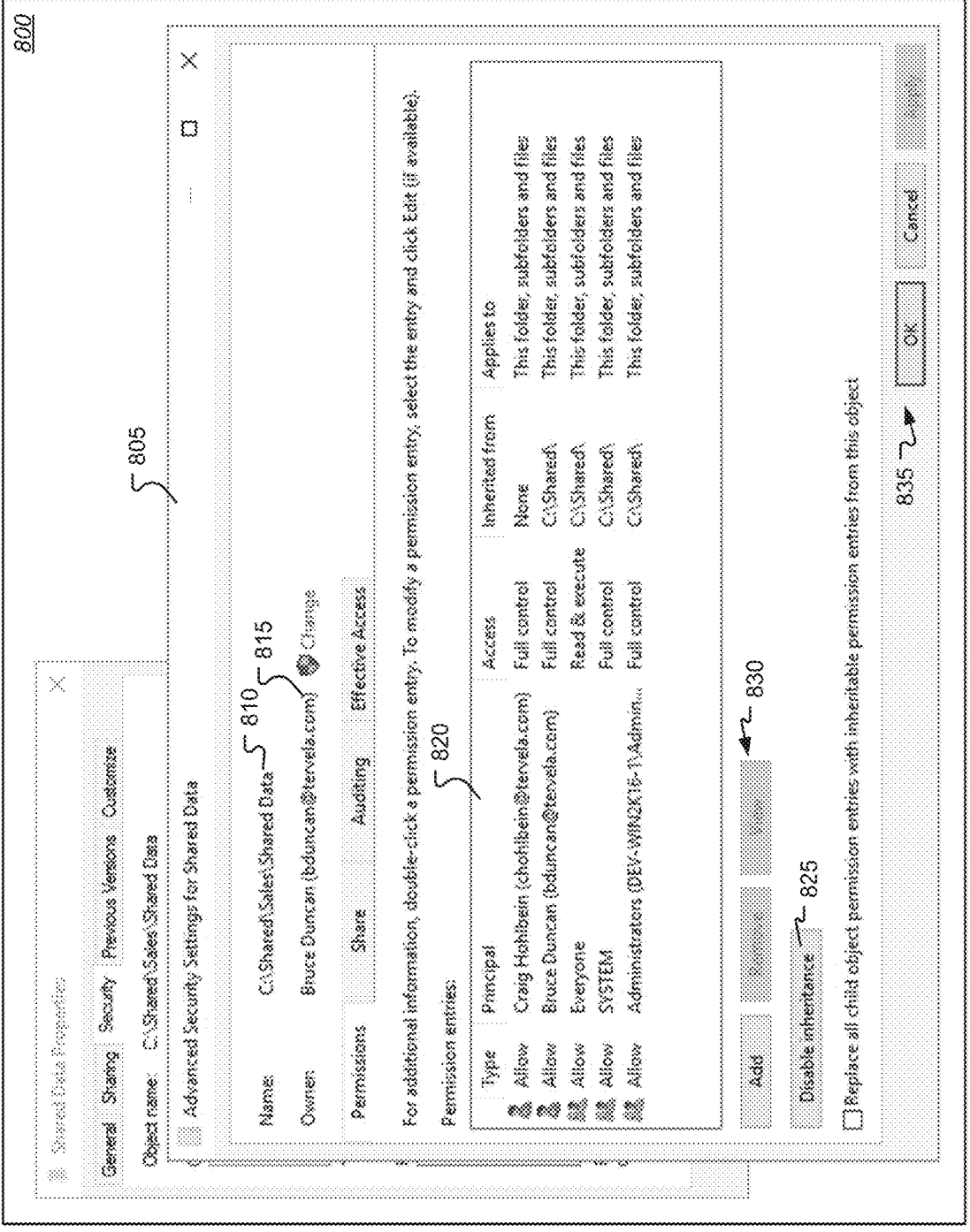
Figure 8C:
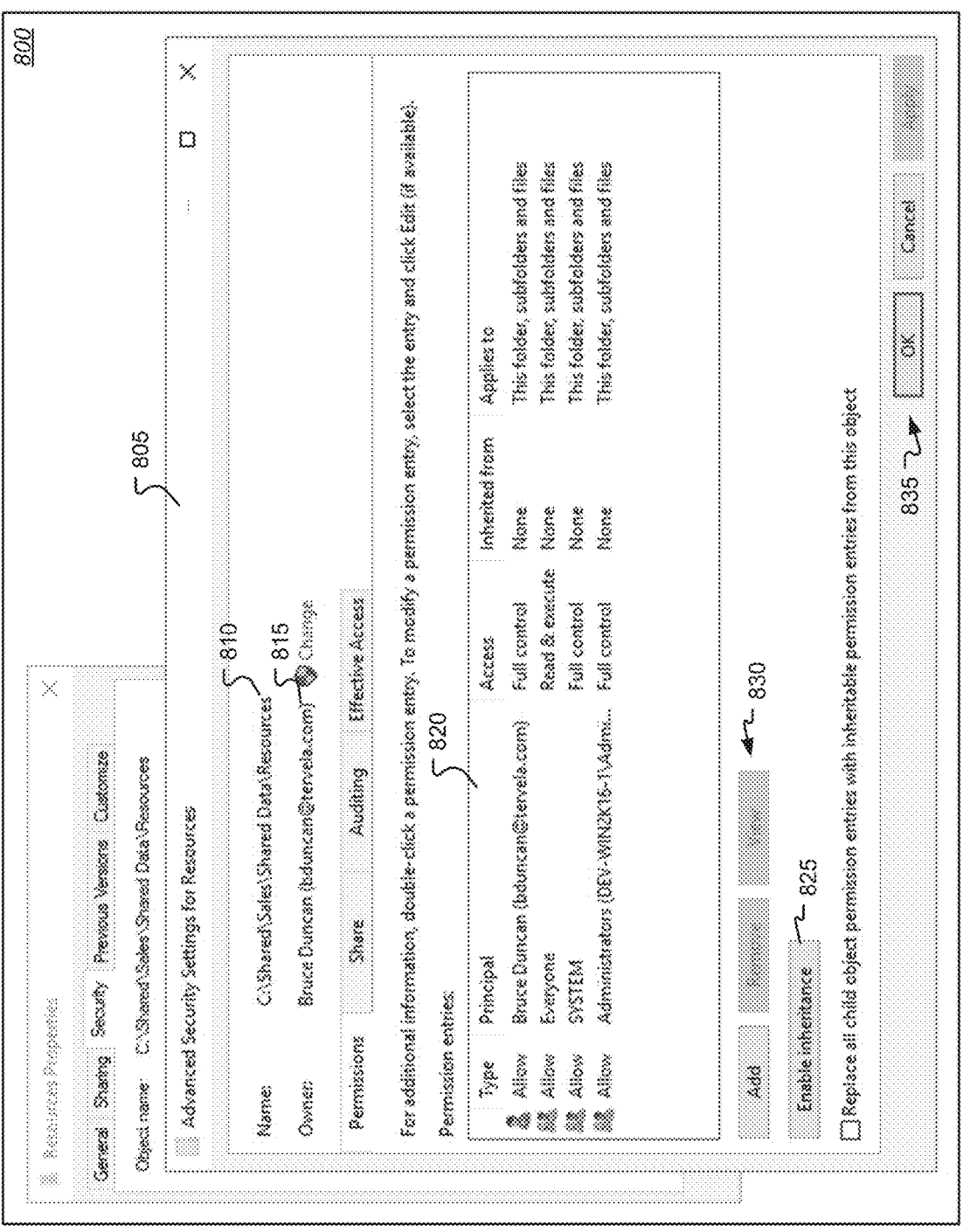

FIGS. 8A-8C are screenshots illustrating an exemplary user interface presenting exemplary permissions on a source system according to one embodiment of the present disclosure. As illustrated in FIG. 8A, the interface 800 can include a window 805 presenting a number of elements relating to resources of the source system. The window 805 can include an indication 810 of a name of a presented resource, e.g., a "Sales" folder, an indication 815 of an owner of the resource, and a list 820 of permissions of that resource, e.g., entities having certain identified permissions. FIGS. 8B and 8C illustrate the same interface 800 updated to present the list

820 of permissions for different resources. Namely, FIG. 8B presents the list 820 of permissions for a resource named "Shared Data" which is a subfolder of the "Sales" folder while FIG. 8C presents the list 820 of permissions for a resource named "Resources" in the "Shared Data" subfolder. In each example, the window 805 can also include a button 825 to enable/disable inheritance for a selected resource, a set of buttons 830 to add, remove, or view a resource, and/or a set of buttons 835 to accept, cancel, or apply permission settings.

In the examples presented in FIGS. 8A-8C, the user "TERVELA\bduncan" has editor permissions on the "Sales" folder. The group "Everyone" has read permissions on the "Sales" folder. The user "TERVELA\chohlbein" has editor permissions on the "Shared Data" folder. The "Resources" folder has inheritance disabled, and has the user "TERVELA\chohlbein" removed as an editor.

Figure 9:
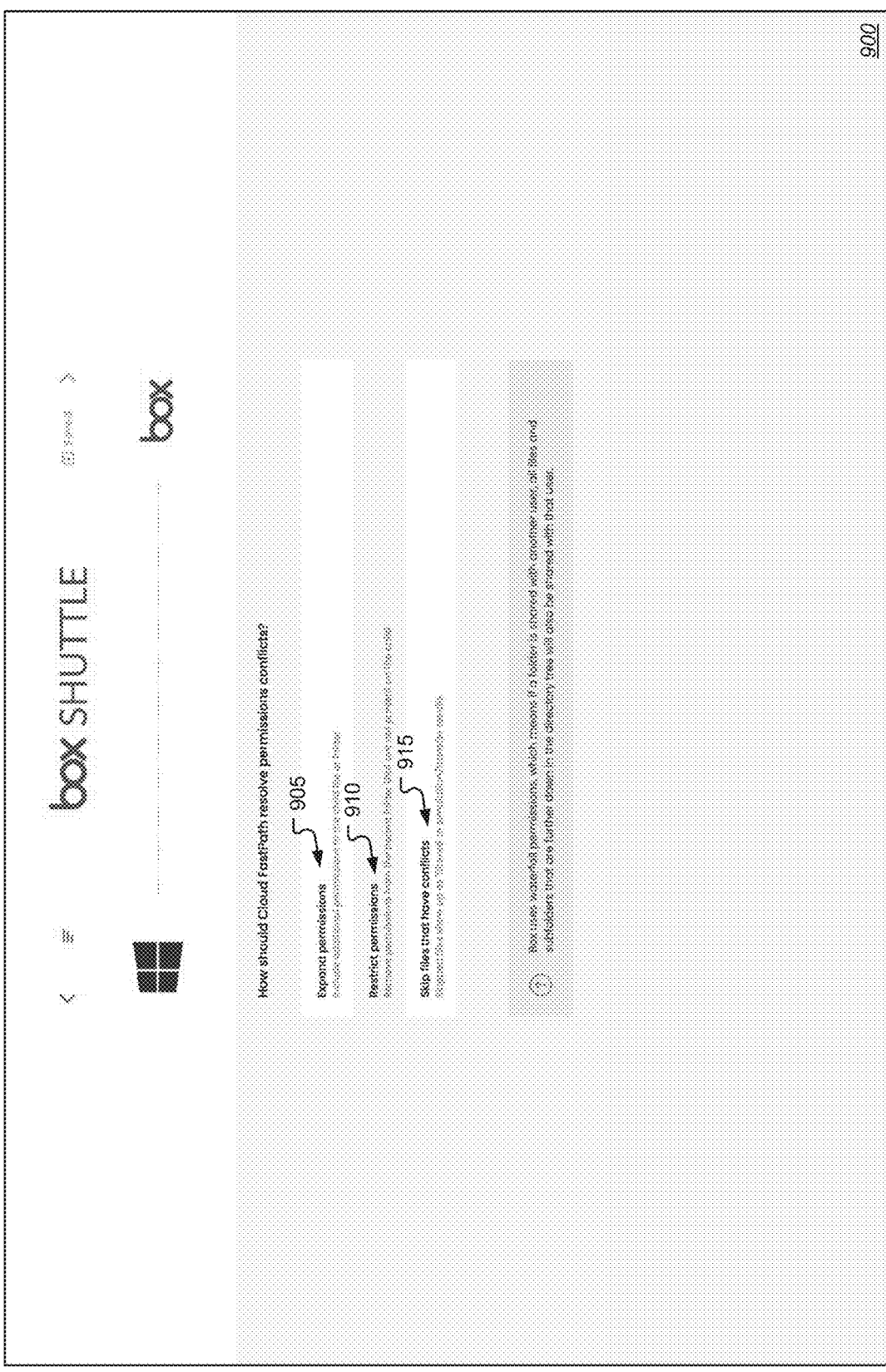
FIG. 9 is a screenshot illustrating an exemplary user interface for selecting a conflict resolution strategy according to one embodiment of the present disclosure.

FIG. 9 is a screenshot illustrating an exemplary user interface for selecting a conflict resolution strategy according to one embodiment of the present disclosure. As illustrated in this example, the user interface 900 can include a list, e.g., a list of textual descriptions identifying available strategies. As shown here and as described above, this list can include, but is not limited to, text for an "Expand permissions" 905 strategy, i.e., an expansive conflict resolution strategy as described above, a "Restrict" 910 strategy, i.e., a restrictive conflict resolution strategy as described above, and a "Skip files that have conflicts" 915, i.e., a warn-and-ship conflict resolution strategy as described above. The user can manipulate a mouse, keyboard, or other input device to select, e.g., click, a desired strategy to be applied.

Figure 10A:
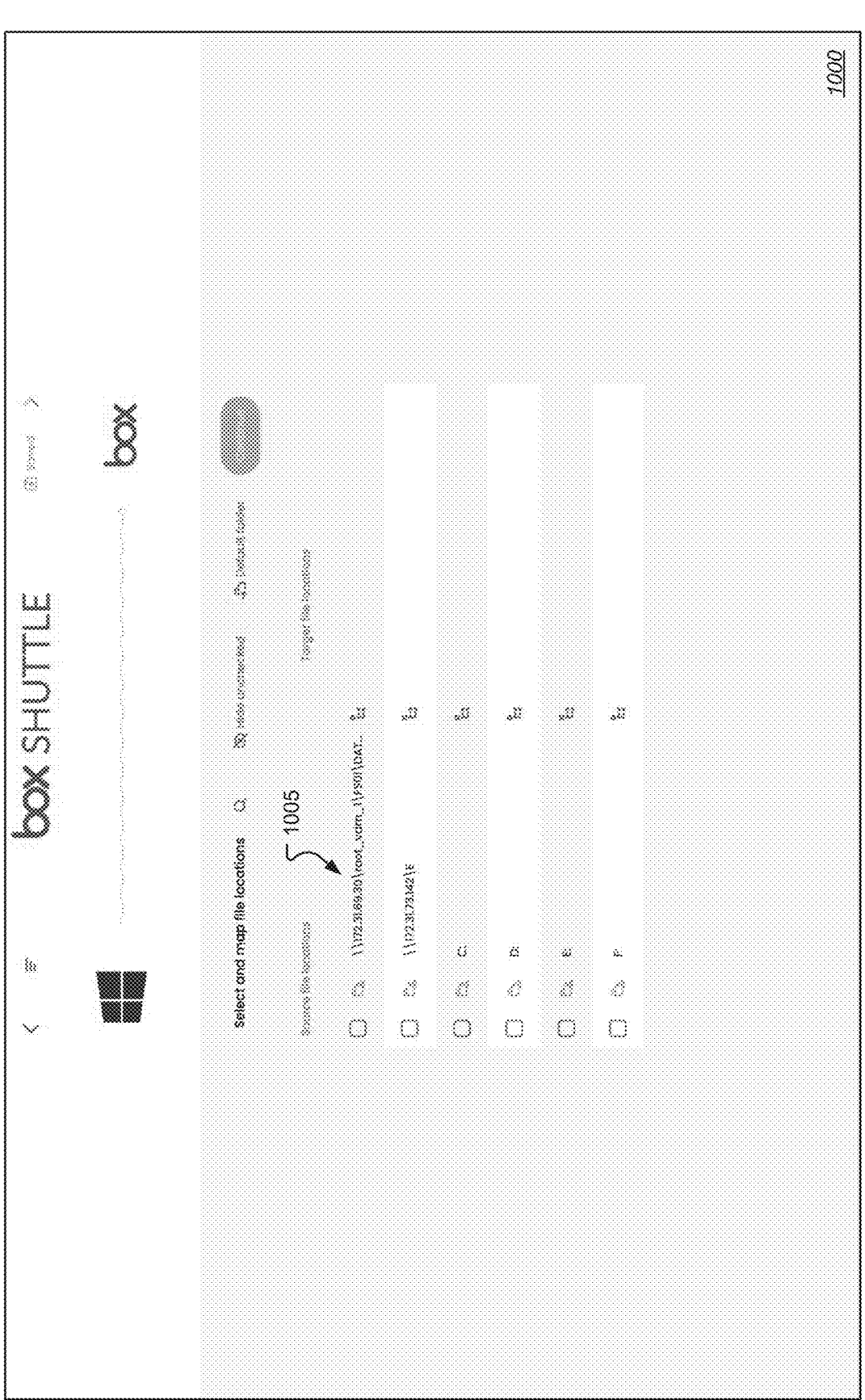
FIGS. 10A-10D are screenshots illustrating an exemplary user interface for specifying path mappings according to one embodiment of the present disclosure.
Figure 10B:
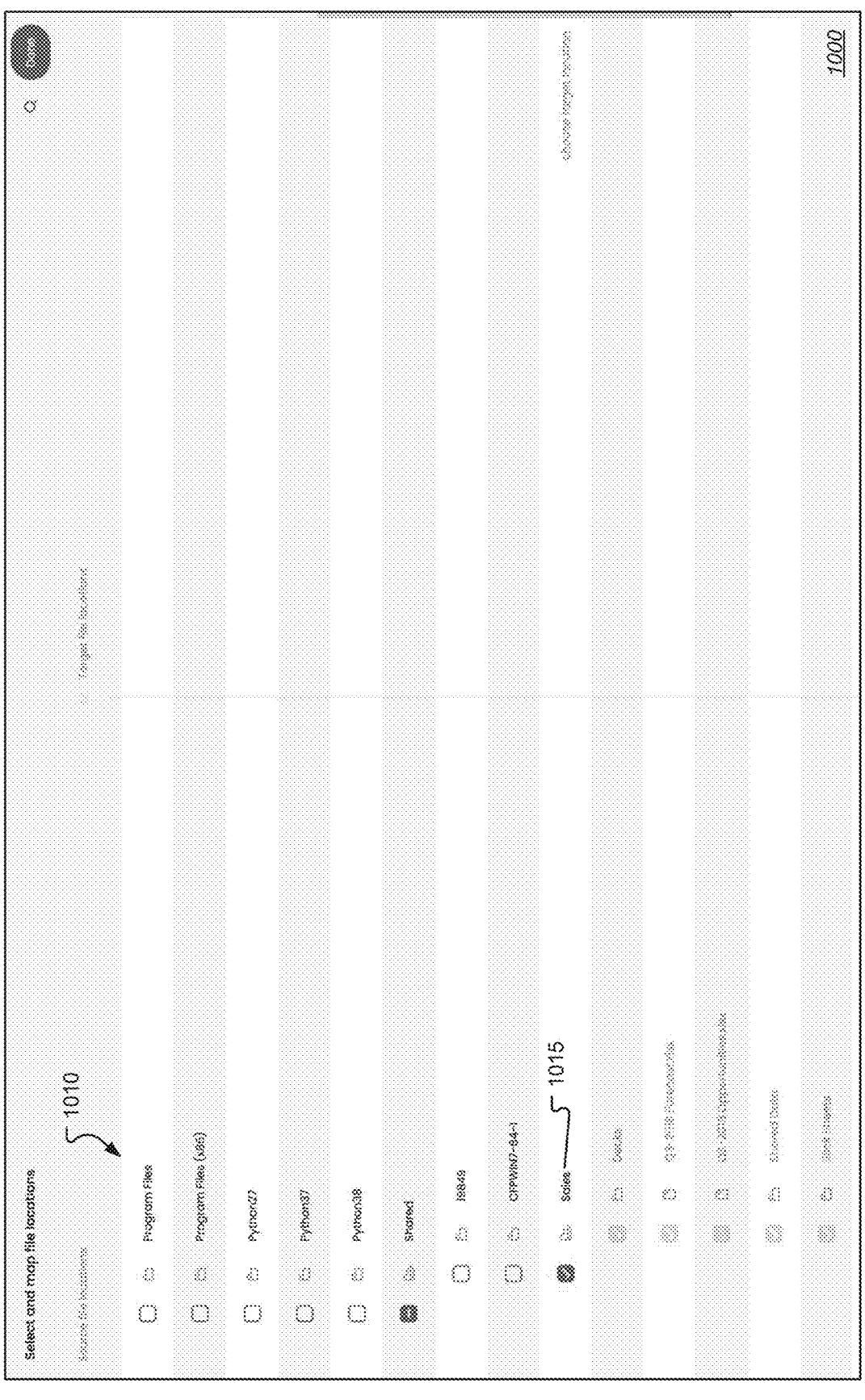
Figure 10C:
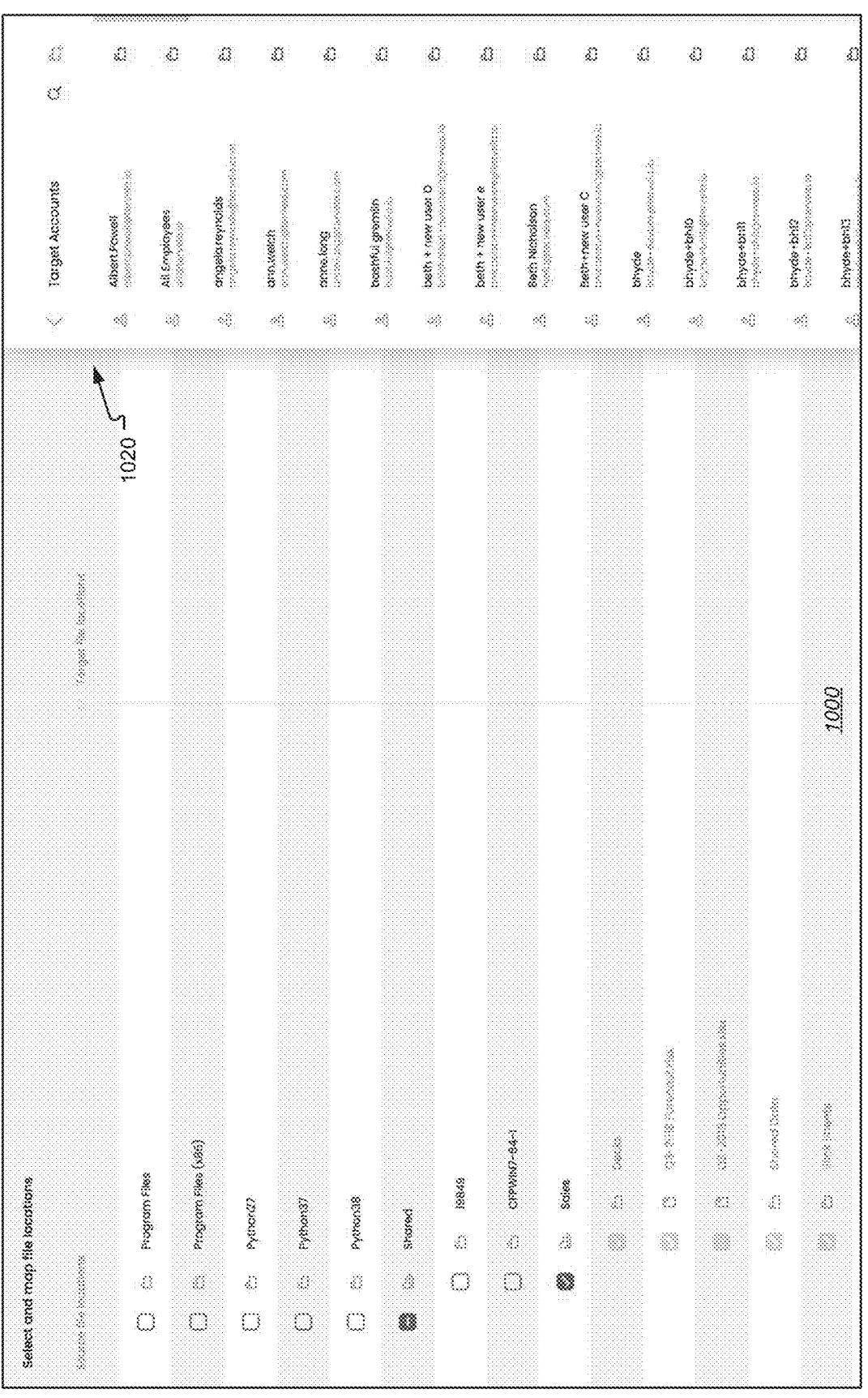
Figure 10D:
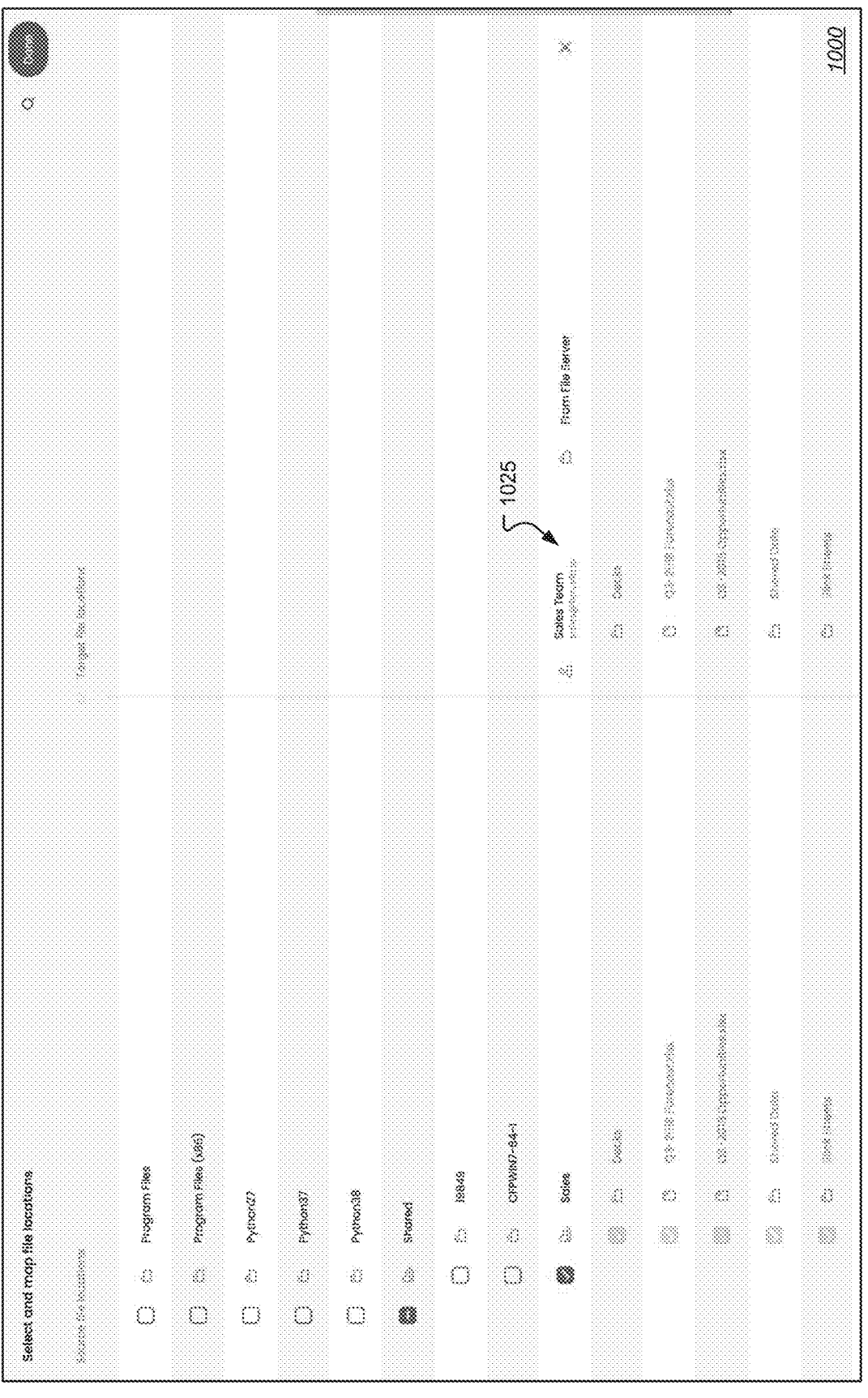

FIGS. 10A-10D are screenshots illustrating an exemplary user interface for specifying path mappings according to one embodiment of the present disclosure. As illustrated in FIG. 10A, the user interface 1000 can include a list 1005 of possible source systems. Once a source system has been selected, a list 1010 of resources of that system can be presented in the interface 1000 and one or more selected resources 1015 can be chosen as illustrated in FIG. 10B. Once a resource has been selected, a list 1020 of targets can be presented as illustrated in FIG. 10C and, as illustrated in FIG. 10D, a selected target 1025 can be chosen.

Figure 11A:
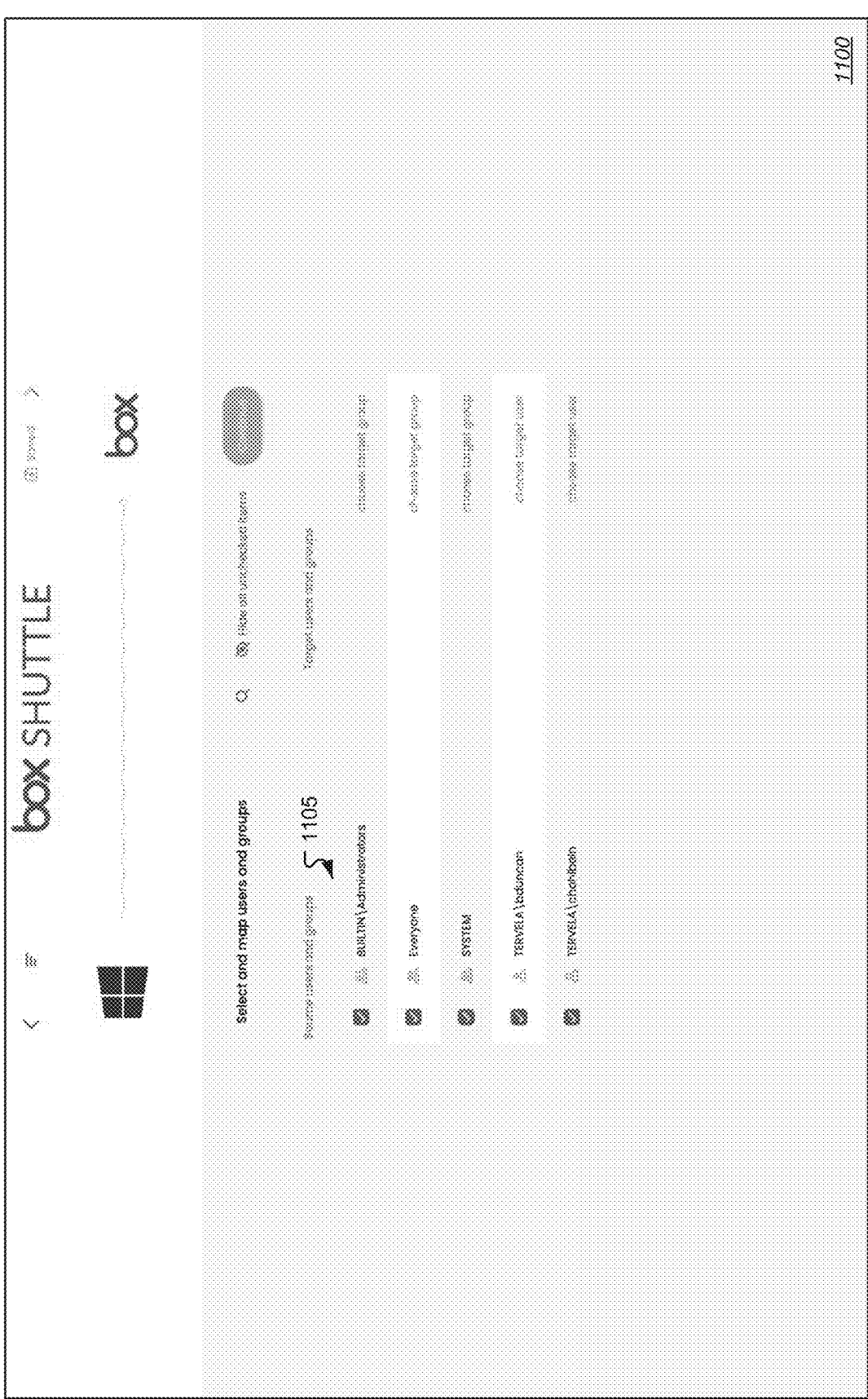
FIGS. 11A-11D are screenshots illustrating an exemplary user interface for specifying subject mappings according to one embodiment of the present disclosure.
Figure 11B:
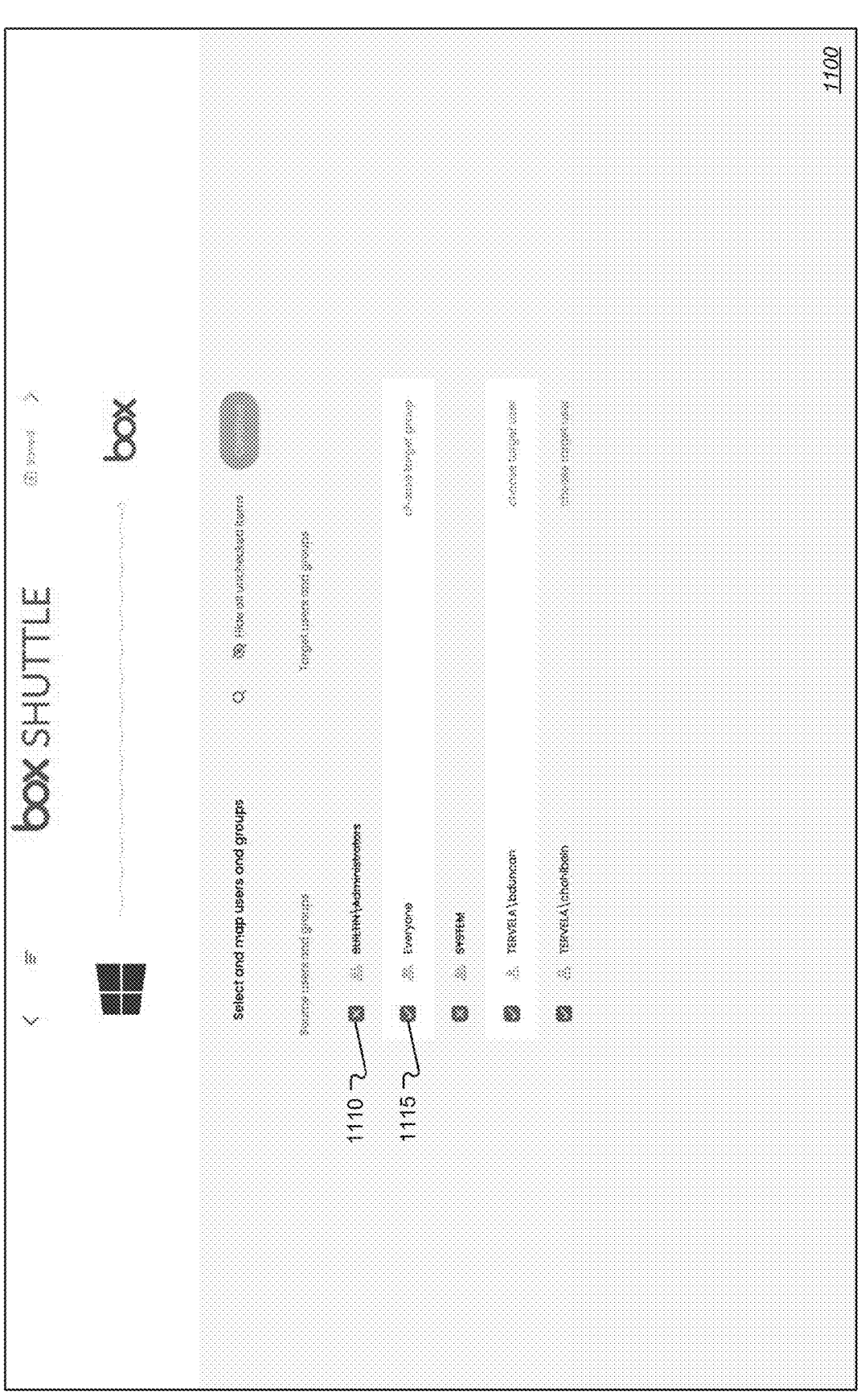
Figure 11C:
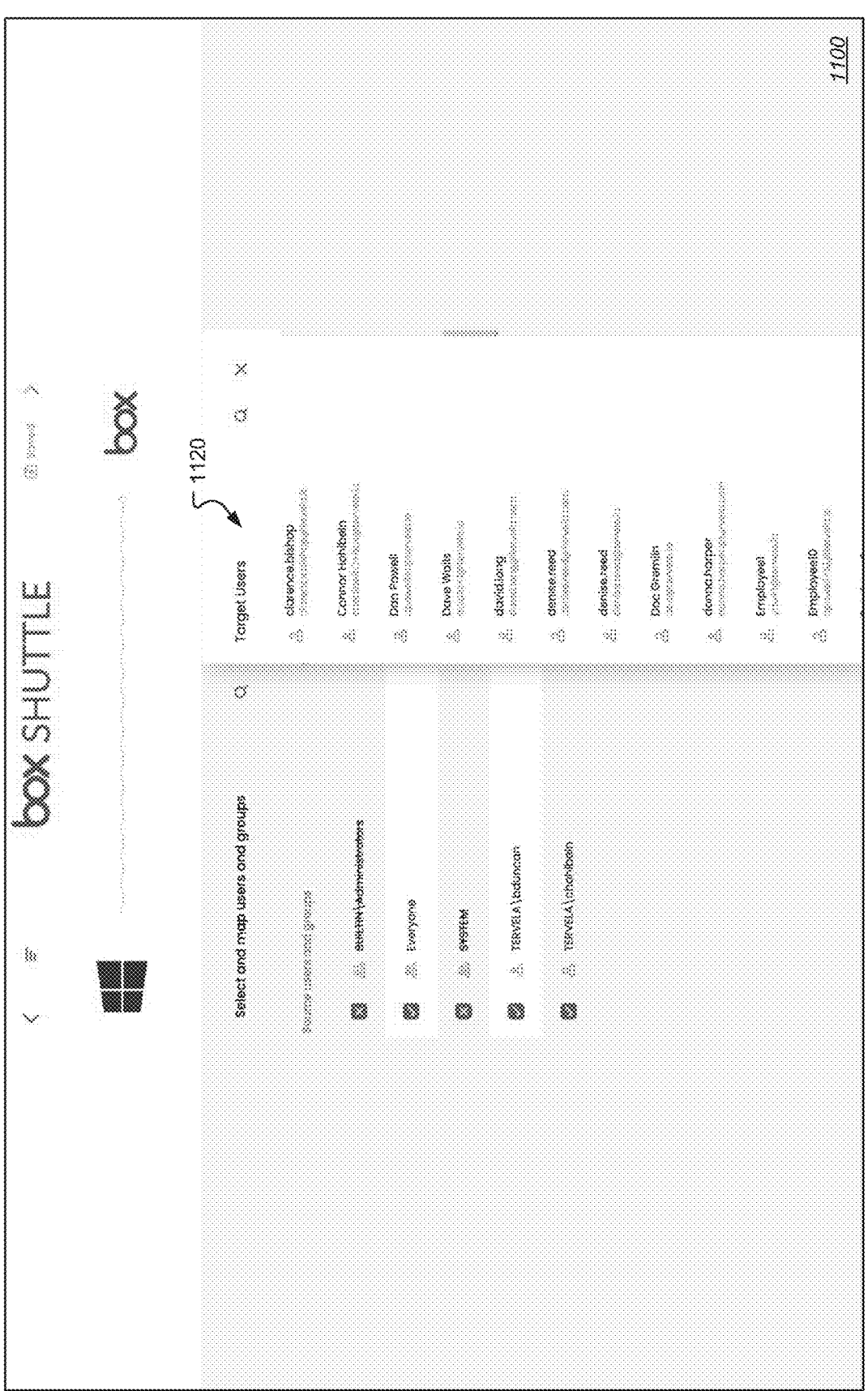
Figure 11D:
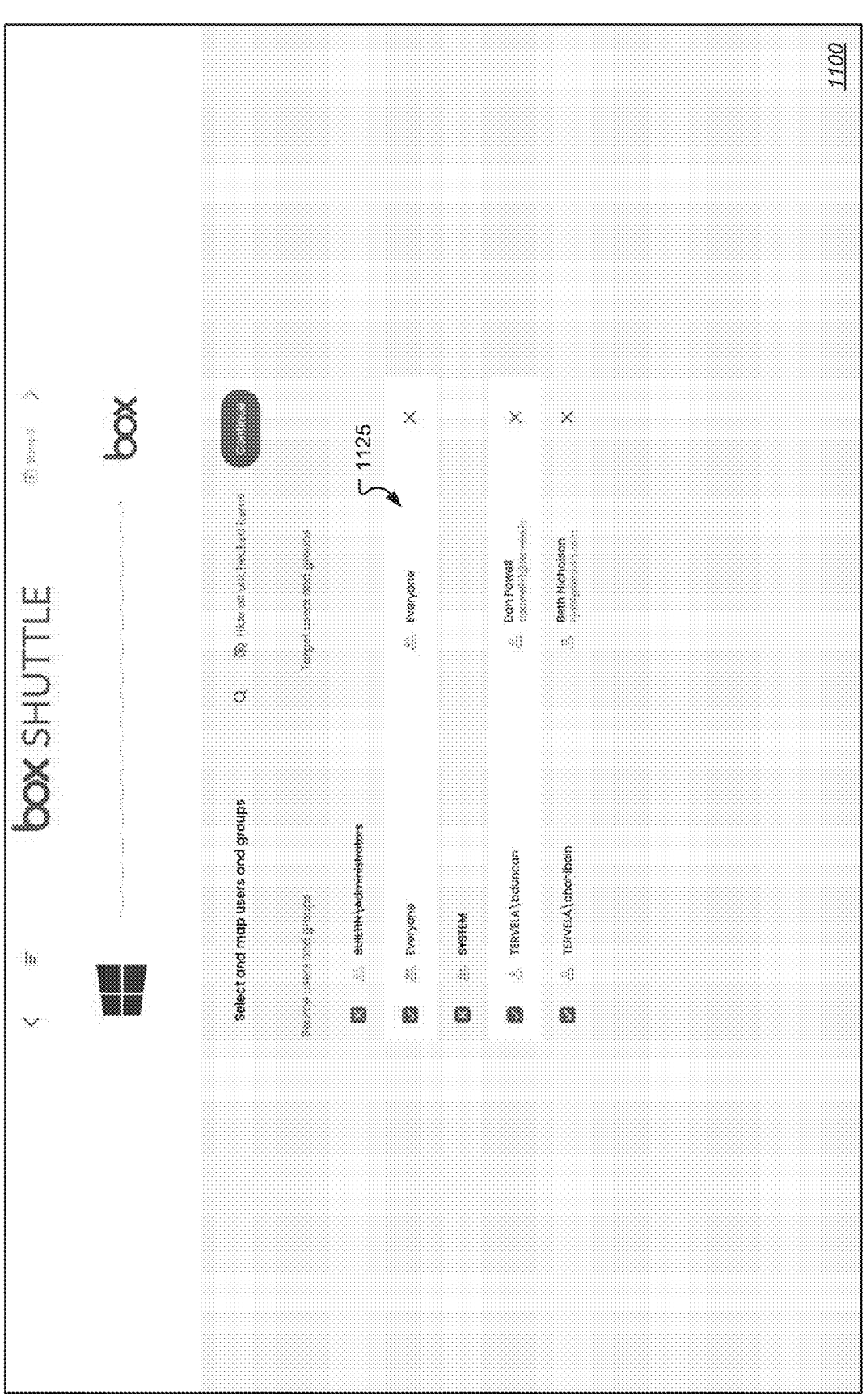

FIGS. 11A-11D are screenshots illustrating an exemplary user interface for specifying subject mappings according to one embodiment of the present disclosure. As illustrated in FIG. 11A, the user interface 1100 can include a list 1105 of users and groups on the source system. As illustrated in FIG. 11B, next to each user and group in this list 1105 can be a checkbox 1110 and 1115 or other control through which a user can deselect, as shown by checkbox 1110, or select, as shown by checkbox 1115, certain users or groups. Once users and groups on the source have been selected, a list 1120 of possible target users can be presented in the interface 1100 as illustrated in FIG. 11C. Finally, as illustrated in FIG. 11D, a list 1125 of selected users on the target, aligned with users and groups on the target system to which they map, can be presented in the user interface 1100.

In the example illustrated in FIGS. 10A-10D and 11A-11D, the "Sales" folder can be mapped into a folder called "From File Server" in an account on the target system called Sales Team. The groups called "BUILTIN\Administrators" and "SYSTEM" on the source can be ignored. The group "Everyone group" on the source can be mapped to a group called "Everyone" on the target. The user "TERVELA\bduncan" on the source can be mapped to an account called "Dan Powell" on the target. Finally, the user "TERVELA\chohlbein" on the source can be mapped to an account called "Beth Nicholson" on the target.

Figure 12A:
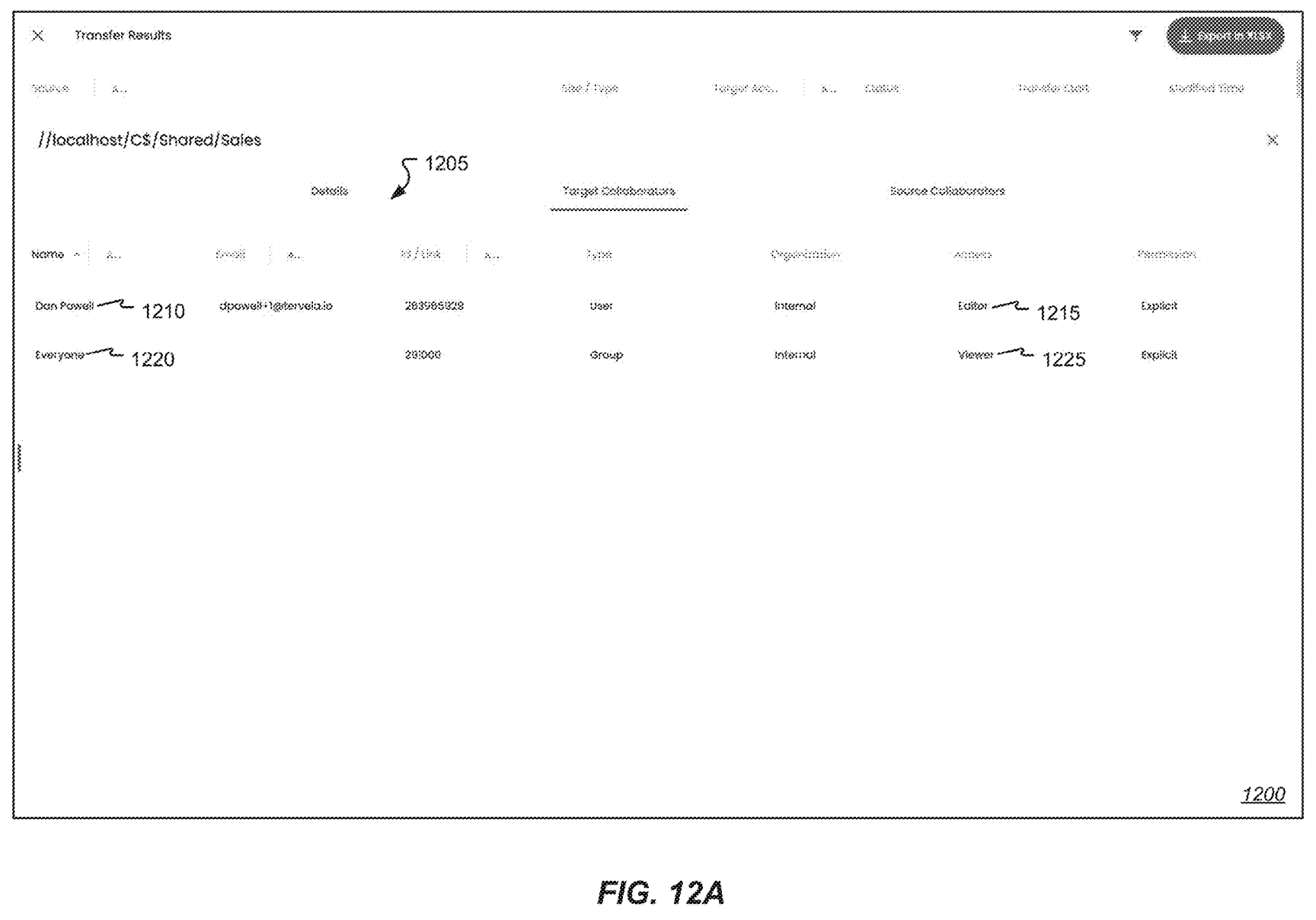
Figure 12B:
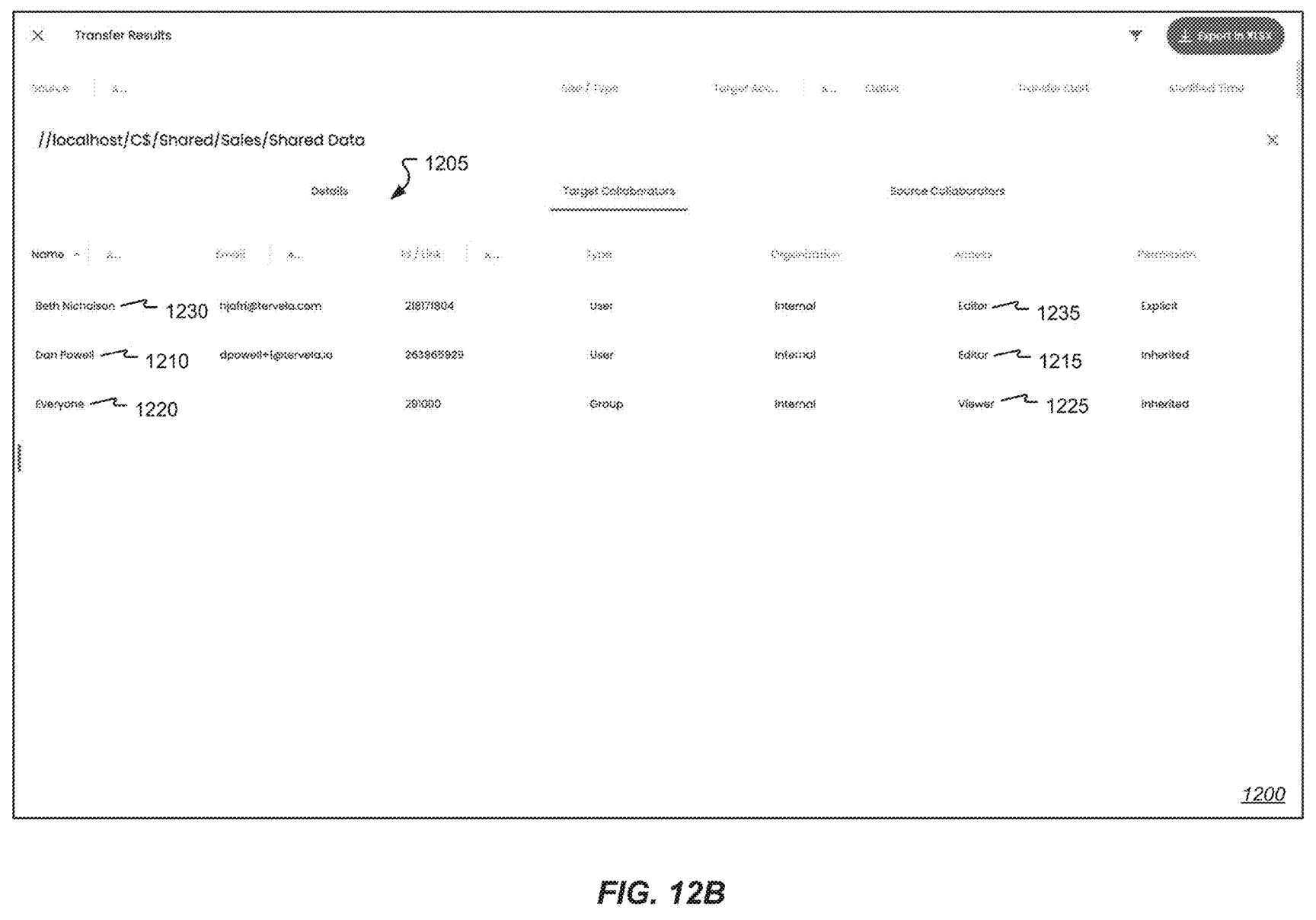

FIGS. 12A and 12B are screenshots illustrating an exemplary user interface presenting migration results using an expansive conflict resolution strategy according to one embodiment of the present disclosure. As illustrated in this example, the user interface 1200 can include a list 1205 of results. As shown in this list 1205 and following the same example described above, when the source resources are transferred to the target using an expansive conflict resolution strategy, all three folders introduced above, i.e., "Sales," "Shared Data," and "Resources" are transferred. As illustrated in FIG. 12A, the account "Dan Powell" 1210 has editor permissions 1215 on the "Sales" folder. The group "Everyone" 1220 has view permissions 1225 on the "Sales" folder. As illustrated in FIG. 12B, both of those permissions 1215 and 1225 are inherited by the "Shared Data" folder. The account "Beth Nicholson" 1230 has editor permissions 1235 on the "Shared Data" folder. The "Resources folder," being a child of the "Shared Data" folder, can inherit all three permissions from the "Shared Data" folder.

Figure 13:
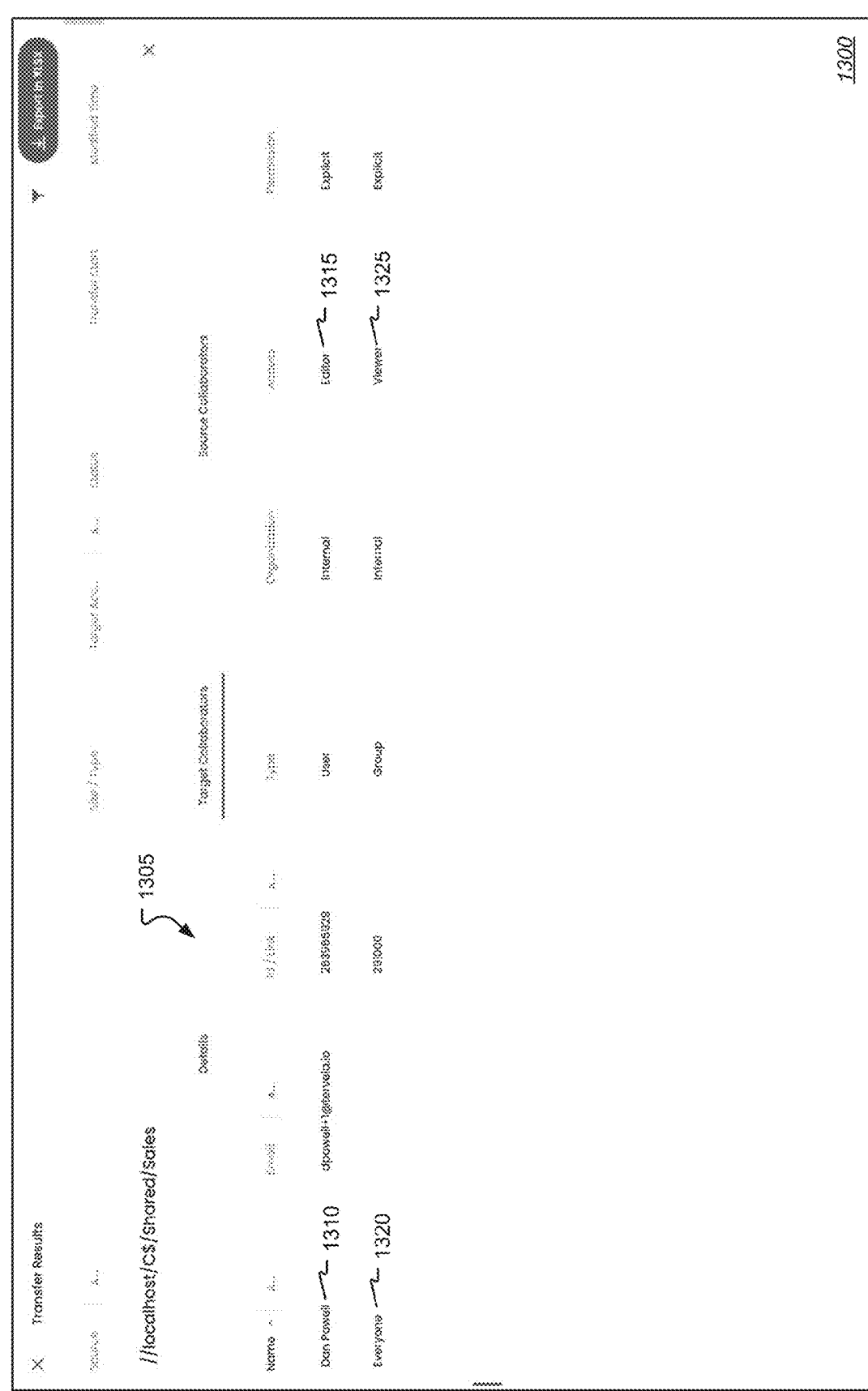
FIG. 13 is a screenshot illustrating an exemplary user interface presenting migration results using a restrictive conflict resolution strategy according to one embodiment of the present disclosure.

FIG. 13 is a screenshot illustrating an exemplary user interface presenting migration results using a restrictive conflict resolution strategy according to one embodiment of the present disclosure. As illustrated in this example, the user interface 1300 can include a list 1305 of results. As shown in this list 1305 and following the same example described above, when the source resources are transferred to the target using an restrictive conflict resolution strategy, all three folders introduced above, i.e., "Sales," "Shared Data," and "Resources" are transferred. The account "Dan Powell" 1310 has editor permissions 1315 on the "Sales" folder. The group "Everyone" 1320 has view permissions 1325 on the "Sales" folder. Both of those permissions are inherited by the "Shared Data" folder as well as the "Resources" folder since they are children of the "Sales" folder. The account "Beth Nicholson" (not shown here) has no permissions assigned on any of the three folders.

FIGS. 14A-14C are screenshots illustrating an exemplary user interface presenting migration results using a warn-and-skip conflict resolution strategy according to one embodiment of the present disclosure. As illustrated in this example, the user interface 1400 can include a list 1405 of transferred resources. As shown in FIG. 14A, when the source resources are transferred to the target using the warn-and-skip conflict resolution strategy, the "Resources" folder 1410 is not transferred, and is marked as "filtered" 1415 in the results list 1405. As further illustrated in FIG. 14B, the account "Dan Powell" 1420 has editor permissions 1425 on the "Sales" folder. The group "Everyone" 1430 has view permissions 1435 on the "Sales" folder. AS illustrated by FIG. 14C, both of those permissions 1425 and 1435 are inherited by the "Shared Data" folder. The account "Beth Nicholson" 1440 has editor permissions 1445 on the "Shared Data" folder.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for identifying and resolving conflicts in access permissions during migration of data and user accounts from a source system to a target system, the method comprising:

receiving, by a migration control system, a set of mappings, the set of mappings comprising path mappings of a hierarchy of data objects on the source system to locations on the target system for migrated data objects and subject mappings of user accounts on the source system to user accounts on the target system, wherein the migration of data and user accounts comprises migrating the data objects from the source system to the target system and migrating existing user accounts on the source system to new user accounts on the target system;

translating, by the migration control system, based on the received set of mapping, permissions controlling access to the data objects of the hierarchy of data objects on the source system to permissions controlling access to the migrated data objects on the target system for one or more user accounts on the target system;

detecting, by the migration control system, one or more conflicts between the permissions controlling access to the data objects of the hierarchy of data objects on the source system and the permissions controlling access to the migrated data objects on the target system for at least one user account of the one or more user accounts;

selecting, by the migration control system, a conflict resolution strategy from a plurality of conflict resolution strategies, wherein the conflict resolution strategy comprises one of a warn-and-skip conflict resolution strategy, an expansive conflict resolution strategy, or a restrictive conflict resolution strategy; and applying, by the migration control system, the selected conflict resolution strategy to the permissions controlling access to the migrated data objects on the target system for the at least one user account, wherein applying the expansive conflict resolution strategy comprises identifying permissions for a parent data object of the data object on the source system for which the conflict has been detected at a level of the hierarchy of data objects of the source system above the data object on the source system for which the conflict has been detected, removing permissions for the migrated data for which the conflict has been detected on the target system, and allowing inheritance of the identified permissions for the parent data object by each child data object on the target system for which the conflict has been detected.

2. The method of claim 1, wherein applying the warn-and-skip conflict resolution strategy comprises presenting an indication of the data or the user account on the source system for which a conflict has been detected.

3. The method of claim 1, wherein applying the restrictive conflict resolution strategy comprises:

identifying the parent data object of the data object on the source system for which the conflict has been detected;

determining whether the identified parent data object explicitly defines permissions or is a root level of the hierarchy; and in response to determining the identified parent data object defines permissions or is the root level of the hierarchy, removing permissions for the at least one user account from the identified parent data object, adding the parent data object to a reprocessing list, identifying a child data object for the identified parent data object at a lower level of the hierarchy than the identified parent data object, and removing permissions from the identified child data object.

4. The method of claim 3, wherein applying the restrictive conflict resolution strategy further comprises:

determining whether additional conflicts exist;

determining whether any paths have been added to the reprocessing list;

determining whether an iteration limit for the restrictive conflict resolution strategy has been reached; and in response to determining additional conflicts exist, determining paths have been added to the reprocessing list, and determining the iteration limit for the restrictive conflict resolution strategy has not been reached, repeating one or more conflicts between the permissions controlling access to the data objects of the hierarchy of data objects on the source system and the permissions controlling access to the migrated data objects on the target system for at least one user account of the one or more user accounts and applying the selected conflict resolution strategy to the permissions controlling access to the migrated data objects on the target system for the at least one user account until determining no paths remain on the reprocessing list or determining the iteration limit for the restrictive conflict resolution strategy has been reached.

5. The method of claim 1, wherein the source system comprises one of a cloud-based system or an on-premise system and the target system comprises a cloud-based system.

6. A system comprising:

a processor; and a memory coupled with and readable by the processor and storing therein a set of instructions which, when executed by the processor, causes the processor to identify and resolve conflicts in access permissions during migration of data and user accounts from a source system to a target system by:

receiving a set of mappings, the set of mappings comprising path mappings of a hierarchy of data objects on the source system to locations on the target system for migrated data objects and subject mappings of user accounts on the source system to user accounts on the target system, wherein the migration of data and user accounts comprises migrating the data objects from the source system to the target system and migrating existing user accounts on the source system to new user accounts on the target system;

translating based on the received set of mapping, permissions controlling access to the data objects of the hierarchy of data objects on the source system to permissions controlling access to the migrated data objects on the target system for one or more user accounts on the target system;

detecting one or more conflicts between the permissions controlling access to the data objects of the hierarchy of data objects on the source system and the permissions controlling access to the migrated data objects on the target system for at least one user account of the one or more user accounts;

selecting a conflict resolution strategy from a plurality of conflict resolution strategies, wherein the conflict resolution strategy comprises one of a warn-and-skip conflict resolution strategy, an expansive conflict resolution strategy, or a restrictive conflict resolution strategy; and applying the selected conflict resolution strategy to the permissions controlling access to the migrated data objects on the target system for the at least one user account, wherein applying the expansive conflict resolution strategy comprises identifying permissions for a parent data object of the data object on the source system for which the conflict has been detected at a level of the hierarchy of data objects of the source system above the data object on the source system for which the conflict has been detected, removing permissions for the migrated data for which the conflict has been detected on the target system, and allowing inheritance of the identified permissions for the parent data object by each child data object on the target system for which the conflict has been detected.

7. The system of claim 6, wherein applying the warn-and-skip conflict resolution strategy comprises presenting an indication of the data or the user account on the source system for which a conflict has been detected.

8. The system of claim 6, wherein applying the restrictive conflict resolution strategy comprises:

identifying the parent data object of the data object on the source system for which the conflict has been detected;

determining whether the identified parent data object explicitly defines permissions or is a root level of the hierarchy; and in response to determining the identified parent data object defines permissions or is the root level of the hierarchy, removing permissions for the at least one user account from the identified parent data object, adding the parent data object to a reprocessing list, identifying a child data object for the identified parent data object at a lower level of the hierarchy than the identified parent data object, and removing permissions from the identified child data object.

9. The system of claim 8, wherein applying the restrictive conflict resolution strategy further comprises:

determining whether additional conflicts exist;

determining whether any paths have been added to the reprocessing list;

determining whether an iteration limit for the restrictive conflict resolution strategy has been reached; and in response to determining additional conflicts exist, determining paths have been added to the reprocessing list, and determining the iteration limit for the restrictive conflict resolution strategy has not been reached, repeating one or more conflicts between the permissions controlling access to the data objects of the hierarchy of data objects on the source system and the permissions controlling access to the migrated data objects on the target system for at least one user account of the one or more user accounts and applying the selected conflict resolution strategy to the permissions controlling access to the migrated data objects on the target system for the at least one user account until determining no paths remain on the reprocessing list or determining the iteration limit for the restrictive conflict resolution strategy has been reached.

10. The system of claim 6, wherein the source system comprises one of a cloud-based system or an on-premise system and the target system comprises a cloud-based system.

11. A non-transitory, computer-readable medium comprising a set of instructions stored therein which, when executed by a processor, causes the processor to identify and resolve conflicts in access permissions during migration of data and user accounts from a source system to a target system by:

receiving a set of mappings, the set of mappings comprising path mappings of a hierarchy of data objects on the source system to locations on the target system for migrated data objects and subject mappings of user accounts on the source system to user accounts on the target system, wherein the migration of data and user accounts comprises migrating the data objects from the source system to the target system and migrating existing user accounts on the source system to new user accounts on the target system;

translating based on the received set of mapping, permissions controlling access to the data objects of the hierarchy of data objects on the source system to permissions controlling access to the migrated data objects on the target system for one or more user accounts on the target system;

detecting one or more conflicts between the permissions controlling access to the data objects of the hierarchy of data objects on the source system and the permissions controlling access to the migrated data objects on the target system for at least one user account of the one or more user accounts;

selecting a conflict resolution strategy from a plurality of conflict resolution strategies, wherein the conflict resolution strategy comprises one of a warn-and-skip conflict resolution strategy, an expansive conflict resolution strategy, or a restrictive conflict resolution strategy; and applying the selected conflict resolution strategy to the permissions controlling access to the migrated data objects on the target system for the at least one user account, wherein applying the expansive conflict resolution strategy comprises identifying permissions for a parent data object of the data object on the source system for which the conflict has been detected at a level of the hierarchy of data objects of the source system above the data object on the source system for which the conflict has been detected, removing permissions for the migrated data for which the conflict has been detected on the target system, and allowing inheritance of the identified permissions for the parent data object by each child data object on the target system for which the conflict has been detected.

12. The non-transitory, computer-readable medium of claim 11, wherein applying the warn-and-skip conflict resolution strategy comprises presenting an indication of the data or the user account on the source system for which a conflict has been detected.

13. The non-transitory, computer-readable medium of claim 11, wherein applying the restrictive conflict resolution strategy comprises:

identifying the parent data object of the data object on the source system for which the conflict has been detected;

determining whether the identified parent data object explicitly defines permissions or is a root level of the hierarchy; and in response to determining the identified parent data object defines permissions or is the root level of the hierarchy, removing permissions for the at least one user account from the identified parent data object, adding the parent data object to a reprocessing list, identifying a child data object for the identified parent data object at a lower level of the hierarchy than the identified parent data object, and removing permissions from the identified child data object.

14. The non-transitory, computer-readable medium of claim 13, wherein applying the restrictive conflict resolution strategy further comprises:

determining whether additional conflicts exist;

determining whether any paths have been added to the reprocessing list;

determining whether an iteration limit for the restrictive conflict resolution strategy has been reached; and in response to determining additional conflicts exist, determining paths have been added to the reprocessing list, and determining the iteration limit for the restrictive conflict resolution strategy has not been reached, repeating one or more conflicts between the permissions controlling access to the data objects of the hierarchy of data objects on the source system and the permissions controlling access to the migrated data objects on the target system for at least one user account of the one or more user accounts and applying the selected conflict resolution strategy to the permissions controlling access to the migrated data objects on the target system for the at least one user account until determining no paths remain on the reprocessing list or determining the iteration limit for the restrictive conflict resolution strategy has been reached.

* * * * *